United States Patent
Wang et al.

(10) Patent No.: US 10,467,757 B2
(45) Date of Patent: Nov. 5, 2019

(54) SYSTEM AND METHOD FOR COMPUTER AIDED DIAGNOSIS

(71) Applicant: SHANGHAI UNITED IMAGING HEALTHCARE CO., LTD., Shanghai (CN)

(72) Inventors: Jiyong Wang, Shanghai (CN); Xiangjun Chen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 47 days.

(21) Appl. No.: 15/662,359

(22) Filed: Jul. 28, 2017

(65) Prior Publication Data
US 2017/0337687 A1    Nov. 23, 2017

Related U.S. Application Data

(63) Continuation of application No. PCT/CN2016/107278, filed on Nov. 25, 2016.

(30) Foreign Application Priority Data

Nov. 30, 2015 (CN) .......................... 2015 1 0862056
Apr. 29, 2016 (CN) .......................... 2016 1 0283527

(51) Int. Cl.
*G06K 9/00* (2006.01)
*G06T 7/11* (2017.01)
(Continued)

(52) U.S. Cl.
CPC .............. *G06T 7/11* (2017.01); *G06K 9/627* (2013.01); *G06K 9/6221* (2013.01);
(Continued)

(58) Field of Classification Search
None
See application file for complete search history.

(56) References Cited

U.S. PATENT DOCUMENTS 6,430,430 B1 * 8/2002 Gosche ................. G06T 7/0012
600/410
6,571,004 B1 * 5/2003 Florent ................. G06T 7/0012
382/128
(Continued)

FOREIGN PATENT DOCUMENTS

CN    101103924 A    1/2008
CN    101162503 A    4/2008
(Continued)

OTHER PUBLICATIONS

Pogorelov et al., GPU-accelerated Real-time Gastrointestinal Diseases Detection, IEEE 29th International Symposium on Computer-Based Medical Systems, 2016, 6 pages.
(Continued)

*Primary Examiner* — Shervin K Nakhjavan
(74) *Attorney, Agent, or Firm* — Metis IP LLC

(57) ABSTRACT

The present disclosure relates to a method for training a classifier. The method includes: acquiring an original image; determining a candidate target by segmenting the original image based on at least two segmentation models; determining a universal set of features by extracting features from the candidate target; determining a reference subset of features by selecting features from the universal set of features; and determining a classifier by performing classifier training based on the reference subset of features.

17 Claims, 17 Drawing Sheets

(51) Int. Cl.
*G06K 9/62* (2006.01)
*G06T 7/00* (2017.01)

(52) U.S. Cl.
CPC .......... *G06K 9/6256* (2013.01); *G06T 7/0012*
(2013.01); *G06K 2209/053* (2013.01); *G06T 2207/10072* (2013.01); *G06T 2207/10081* (2013.01); *G06T 2207/10088* (2013.01); *G06T 2207/10104* (2013.01); *G06T 2207/10116* (2013.01); *G06T 2207/10132* (2013.01); *G06T 2207/20081* (2013.01); *G06T 2207/20084* (2013.01); *G06T 2207/20221* (2013.01); *G06T 2207/30064* (2013.01)

(56) References Cited

U.S. PATENT DOCUMENTS

| | | | |
|---|---|---|---|
| 6,937,776 B2 | 8/2005 | Li et al. | |
| 6,986,076 B1 | 1/2006 | Smith et al. | |
| 7,203,360 B2* | 4/2007 | Lee | G06K 9/00624 382/155 |
| 7,461,048 B2* | 12/2008 | Teverovskiy | G16H 50/50 706/62 |
| 7,912,294 B2* | 3/2011 | Bogoni | G06T 7/0012 382/131 |
| 9,471,973 B2 | 10/2016 | Enzmann et al. | |
| 2002/0164061 A1* | 11/2002 | Paik | G06T 7/0012 382/131 |
| 2003/0099385 A1 | 5/2003 | Zeng et al. | |
| 2003/0194119 A1 | 10/2003 | Manjeshwar et al. | |
| 2003/0223627 A1* | 12/2003 | Yoshida | G06T 7/0012 382/128 |
| 2004/0052328 A1* | 3/2004 | Sabol | G06T 7/0012 378/37 |
| 2004/0151356 A1* | 8/2004 | Li | G06K 9/527 382/131 |
| 2005/0014217 A1* | 1/2005 | Mattheakis | G01N 33/5067 435/40.5 |
| 2005/0043614 A1 | 2/2005 | Huizenga et al. | |
| 2005/0074834 A1* | 4/2005 | Chaplen | G01N 15/1475 435/34 |
| 2005/0207630 A1 | 9/2005 | Chan et al. | |
| 2005/0259855 A1 | 11/2005 | Dehmeshki | |
| 2005/0259873 A1* | 11/2005 | Sung | G06K 9/00597 382/195 |
| 2006/0110030 A1* | 5/2006 | Sung | G06K 9/00597 382/159 |
| 2006/0127881 A1* | 6/2006 | Wong | G06K 9/00127 435/4 |
| 2006/0257031 A1* | 11/2006 | Abramoff | G06K 9/6277 382/224 |
| 2009/0028403 A1* | 1/2009 | Bar-Aviv | G06F 19/321 382/128 |
| 2009/0136111 A1 | 5/2009 | Jabri et al. | |
| 2009/0148007 A1* | 6/2009 | Zhao | G06K 9/6255 382/128 |
| 2009/0175514 A1* | 7/2009 | Zhao | G06K 9/6228 382/128 |
| 2009/0304248 A1* | 12/2009 | Zalis | G06F 19/321 382/131 |
| 2011/0038523 A1* | 2/2011 | Boardman | G06T 7/0012 382/133 |
| 2011/0142301 A1 | 6/2011 | Boroczky et al. | |
| 2012/0052063 A1* | 3/2012 | Bhargava | G06K 9/6277 424/133.1 |
| 2012/0053464 A1* | 3/2012 | Murashita | G06T 3/403 600/443 |
| 2012/0183193 A1* | 7/2012 | Wels | G06K 9/4614 382/131 |
| 2012/0189176 A1* | 7/2012 | Giger | G06K 9/6253 382/128 |
| 2012/0257804 A1 | 10/2012 | Zhang et al. | |
| 2012/0294502 A1* | 11/2012 | Chan | G06T 7/0012 382/131 |
| 2013/0028517 A1* | 1/2013 | Yoo | G06K 9/00375 382/173 |
| 2014/0233820 A1* | 8/2014 | Wu | A61B 6/505 382/131 |
| 2014/0276684 A1* | 9/2014 | Huennekens | A61B 17/320758 606/7 |
| 2014/0303478 A1* | 10/2014 | Roche | G01R 33/5608 600/410 |
| 2015/0254843 A1* | 9/2015 | Brown | G06T 7/0012 382/131 |
| 2016/0071264 A1* | 3/2016 | Agam | G06T 7/0012 382/128 |
| 2016/0110632 A1* | 4/2016 | Kiraly | G06K 9/66 382/128 |
| 2016/0155225 A1* | 6/2016 | Madabhushi | G06T 7/0012 382/131 |
| 2016/0260211 A1* | 9/2016 | Gillies | G06T 7/41 |
| 2016/0261727 A1 | 9/2016 | Yang et al. | |
| 2016/0275678 A1* | 9/2016 | Onal | G06T 7/0012 |
| 2017/0206662 A1 | 7/2017 | Wang et al. | |
| 2017/0249744 A1 | 8/2017 | Wang et al. | |
| 2017/0293717 A1 | 10/2017 | Yu | |
| 2017/0330239 A1 | 11/2017 | Luo et al. | |
| 2018/0091586 A1 | 3/2018 | Auradkar et al. | |
| 2018/0120813 A1 | 5/2018 | Coffman et al. | |

FOREIGN PATENT DOCUMENTS

| | | |
|---|---|---|
| CN | 102118561 A | 7/2011 |
| CN | 102819836 A | 12/2012 |
| CN | 103366367 A | 10/2013 |
| CN | 103473767 A | 12/2013 |
| CN | 103778600 A | 5/2014 |
| CN | 103942799 A | 7/2014 |
| CN | 104036025 A | 9/2014 |
| CN | 104618343 A | 5/2015 |
| CN | 104732086 A | 6/2015 |
| CN | 104809723 A | 7/2015 |
| CN | 104933709 A | 9/2015 |
| CN | 104933711 A | 9/2015 |
| CN | 105243277 A | 1/2016 |
| CN | 105469419 A | 4/2016 |
| CN | 105488800 A | 4/2016 |
| CN | 105976367 A | 9/2016 |
| CN | 106096254 A | 11/2016 |
| CN | 106156057 A | 11/2016 |
| JP | 2008015814 A | 1/2008 |

OTHER PUBLICATIONS

Ta et al., Big Data Stream Computing in Healthcare Real-Time Analytics, Department of Computer Science and Information Engineering National Taipei University of Technology, 2016, 6 pages.
Pogorelov et al., Efficient Processing of Videos in a Multi-Auditory Environment Using Device Lending of GPUs, Proceedings of the 7th International Conference on Multimedia Systems, Article No. 36, 2016, 4 pages.
First Office Action for Chinese Application No. 201510862056.2 dated Oct. 10, 2017, 14 pages.
International Search Report in PCT/CN2016/107278 dated Mar. 1, 2017, 7 pages.
Pierrick Bruneau et al., Parsimonious reduction of Gaussian mixture models with a variational-Bayes approach. Pattern Recognition, 2010, 43: 850-58.
First Office Action in Chinese Application No. 201610283527.9 dated May 3, 2018, 17 pages.
The Second Office Action in Chinese Application No. 201510862056.2 dated Jun. 25, 2018, 14 pages.
Wang, Xin, Research of Pulmonary Nodules Detection in CT Lung Images, China Master's Theses Full-text Database Medical and Health Science and Technology Series, 2016(1): 13-14 (2015).

(56) References Cited

OTHER PUBLICATIONS

Zhao, Wei, The Computer-Aided Diagnosis of Pneumoconiosis, China Master's Theses Full-text Database Medical and Health Science and Technology Series, 2012(5): Chapter 3 (2012).

* cited by examiner

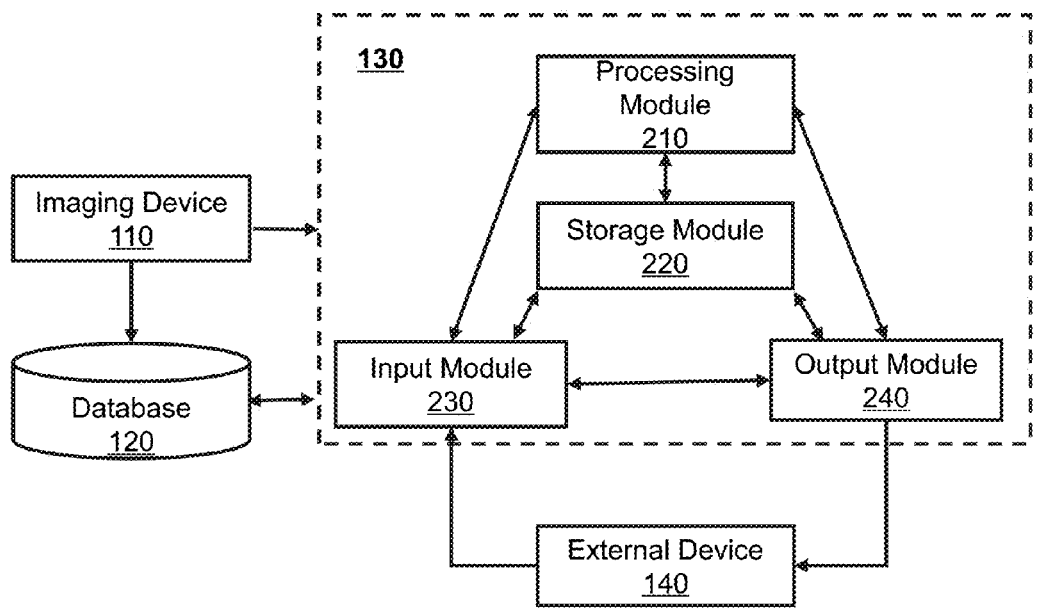
FIG. 2-A
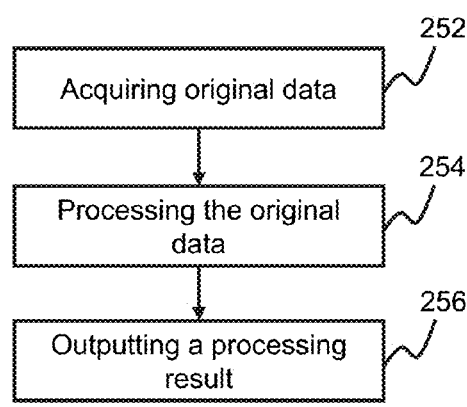
FIG. 2-B

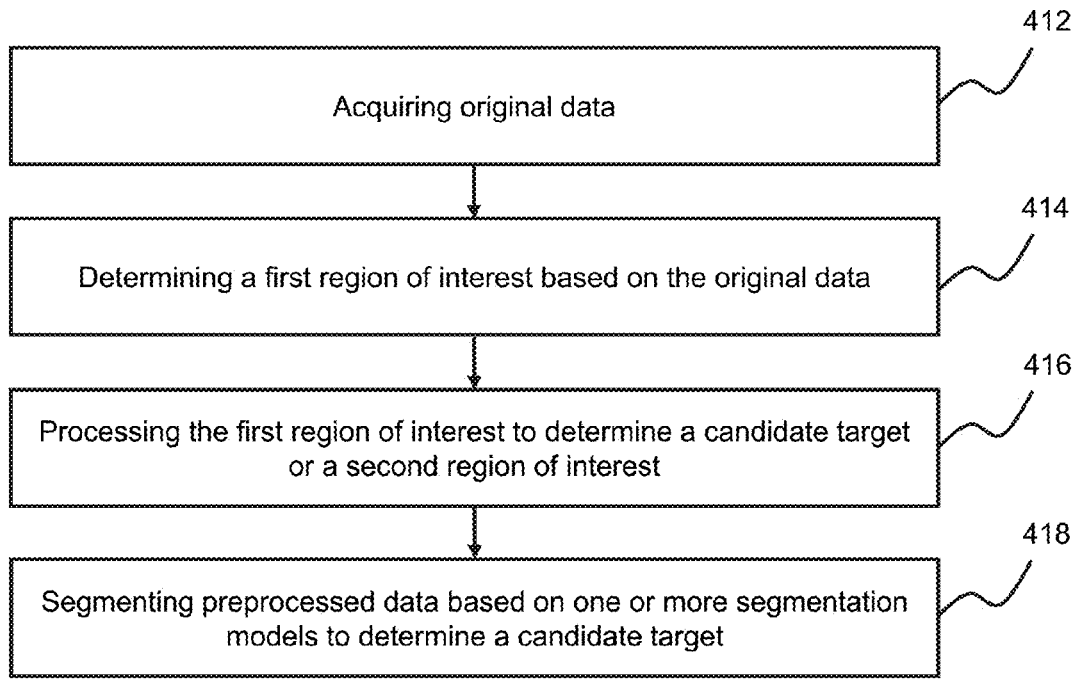
FIG. 4-A
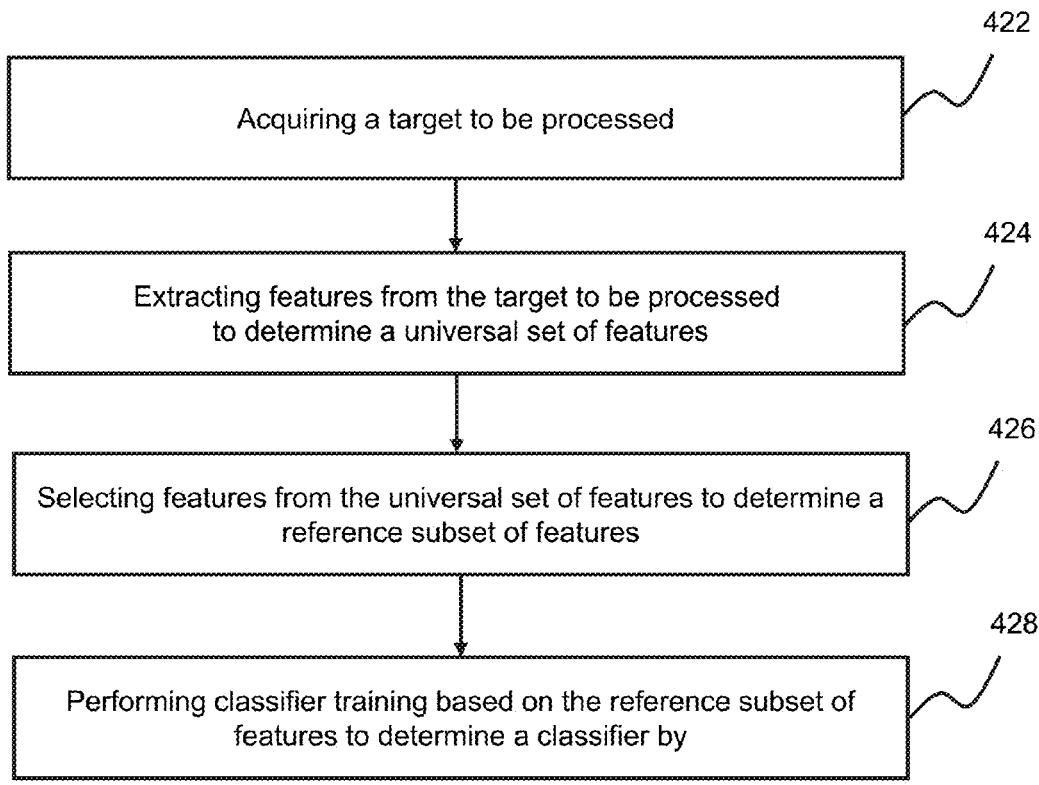
FIG. 4-B

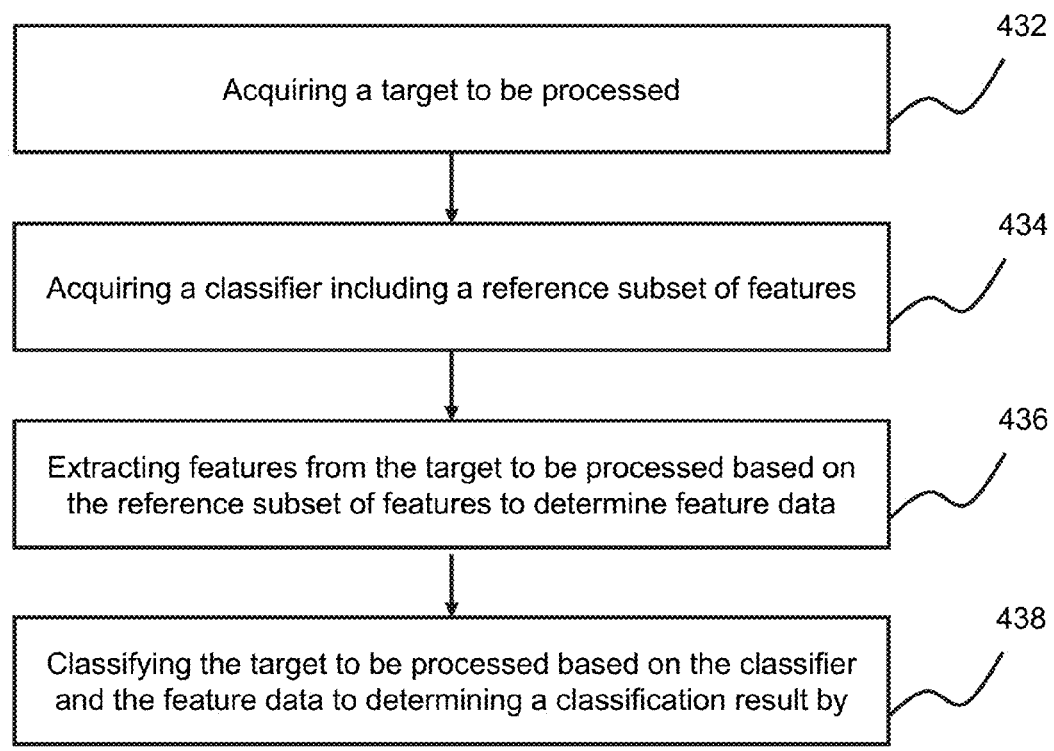
FIG. 4-C

| Image<br>Segmentation method | Medical image S1 | Interpolation image S2 | Hessian dot-enhanced image S4 | Hessian line-enhanced image S5 | Morphology image S3 |
|---|---|---|---|---|---|
| Fixed threshold region growing method | S11 | S12 | S6 | S7 | — |
| VEM | S8 | S13 | S9 | S10 | — |

FIG. 10

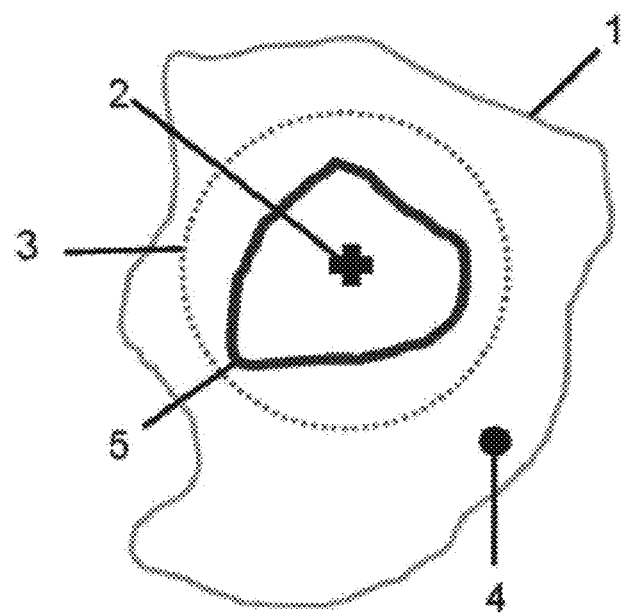
FIG. 13
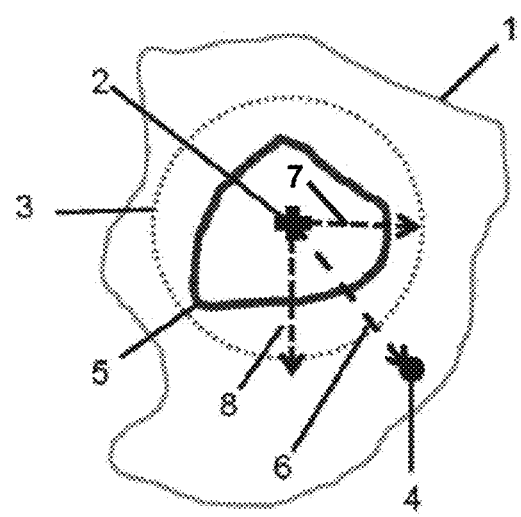
FIG. 14-A
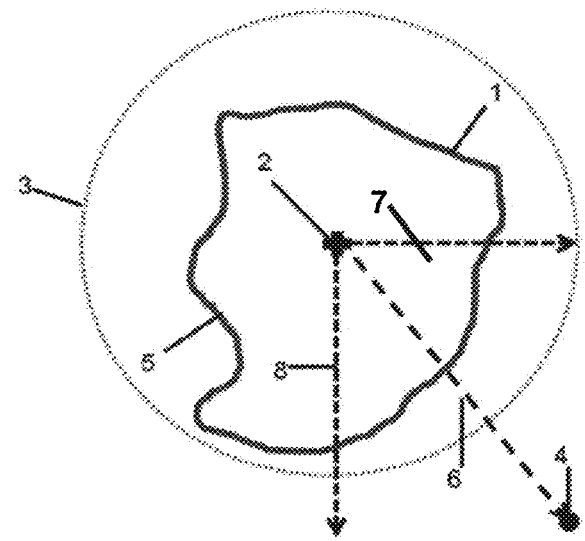
FIG. 14-B

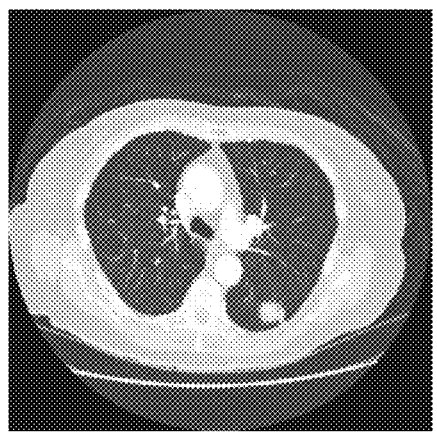
FIG. 16-A
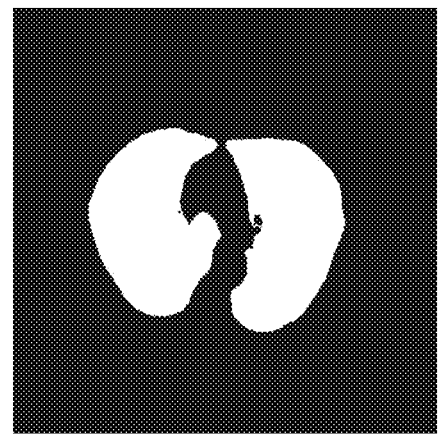
FIG. 16-B
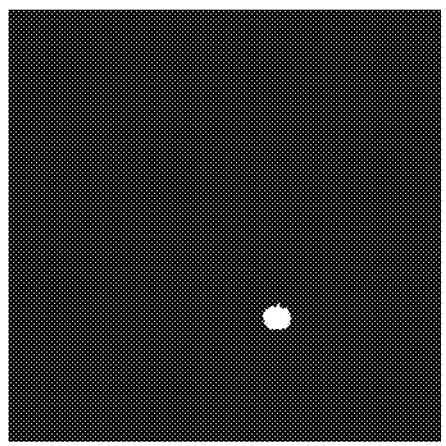
FIG. 16-C

| Diagnosis of pulmonary nodules | Result of the diagnosis 0.73333 |
|---|---|

FIG. 17

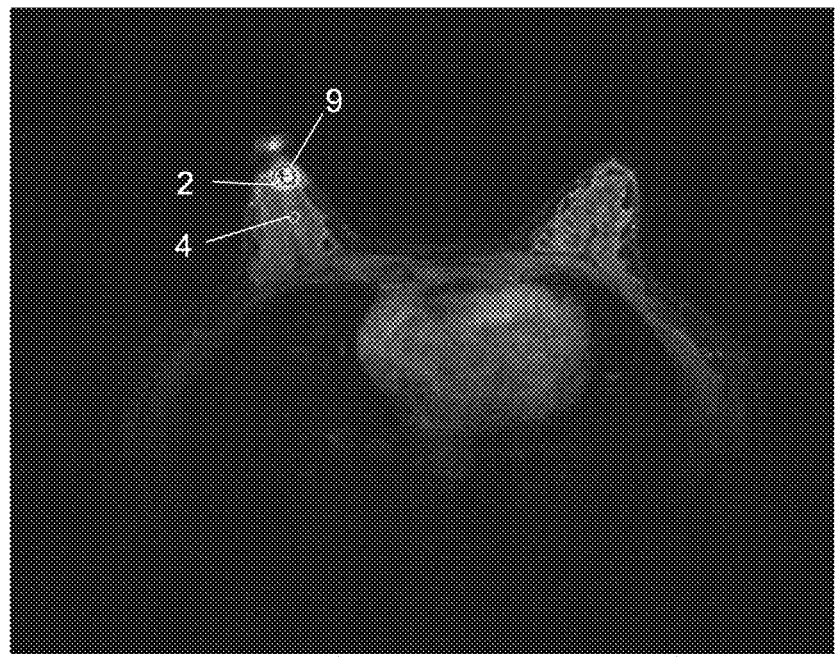
FIG. 18-A
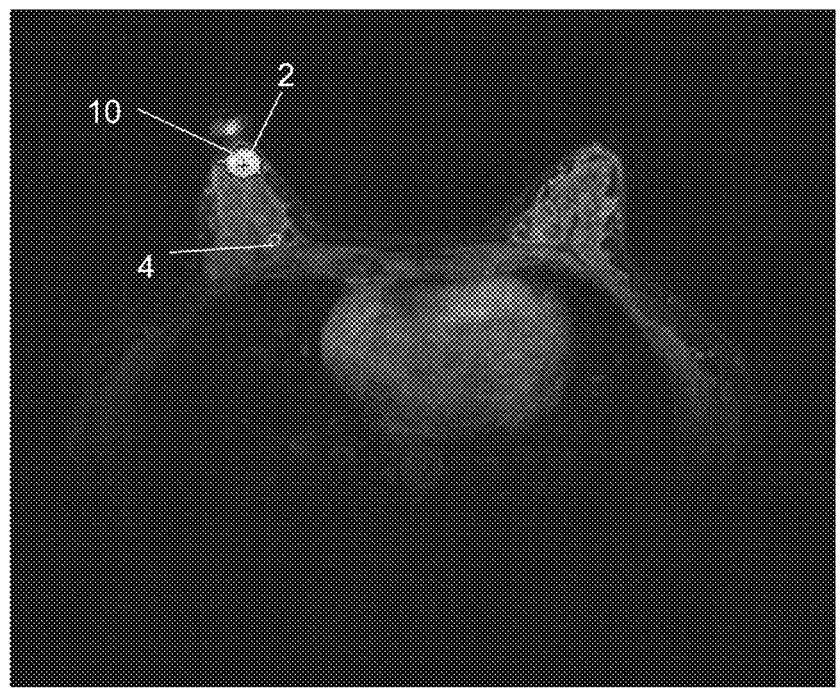
FIG. 18-B

SYSTEM AND METHOD FOR COMPUTER AIDED DIAGNOSIS

CROSS-REFERENCE TO RELATED APPLICATIONS

This application is a continuation of International Application No. PCT/CN2016/107278, filed on Nov. 25, 2016, which claims priority of Chinese Patent Application No. 201510862056.2 filed on Nov. 30, 2015, and Chinese Patent Application No. 201610283527.9 filed on Apr. 29, 2016, the entire contents of which are hereby incorporated by reference.

TECHNICAL FIELD

The present disclosure generally relates to systems and methods for computer aided diagnosis (CAD), and more particularly to systems and methods for segmenting an image and training a classifier in computer aided diagnosis.

BACKGROUND

The computer aided diagnosis (CAD) system may be used to detect lesions, display diagnosis results relating to the lesions to doctors, and support doctors to locate, diagnose and quantitatively analyze the lesions (e.g., a pulmonary nodule, a breast calcification, a breast mass, polyp, etc.) in medical images to reduce misdiagnoses and missed diagnoses and increase correct diagnosis rate. Accordingly, it would be desirable to improve the efficiency and accuracy of the detection and/or diagnosis of a CAD system.

SUMMARY

According to a first aspect of the present disclosure, a method for training a classifier may comprise: acquiring an original image; determining a candidate target by segmenting the original image based on at least two segmentation models; determining a universal set of features by extracting features from the candidate target; determining a reference subset of features by selecting features from the universal set of features; and determining a classifier by performing classifier training based on the reference subset of features.

In some embodiments, the original image may include an X-ray image, a computer tomography (CT) image, a Positron Emission Tomography (PET) image, a Magnetic Resonance Imaging (MRI) image, an ultrasonic image, an electrocardiogram, or an electroencephalogram.

In some embodiments, the at least two segmentation models may include a morphological model and a statistical model.

In some embodiments, the morphological model may include a fixed threshold region growing model based on a Hessian enhancement.

In some embodiments, the statistical model may include a clustering model.

In some embodiments, the clustering model may include a variational expectation maximization model.

In some embodiments, the method may further comprise: determining preprocessed data by preprocessing the original image, the preprocessing including an interpolation treatment, a morphological treatment, a Hessian dot-enhancement treatment, or a Hessian line-enhancement treatment.

In some embodiments, the universal set of features may include features extracted from the candidate target, the candidate target may be determined by segmenting the preprocessing data based on the at least two segmentation models.

In some embodiments, the method of determining the reference subset of features by selecting features from the universal set of features may include a simulated annealing algorithm.

According to a second aspect of the present disclosure, a method of computer aided diagnosis may comprise: acquiring an original image; determining a candidate target by segmenting the original image based on at least two segmentation models; acquiring a classifier including a reference subset of features; determining feature data by extracting features from the candidate target based on the reference subset of features; and determining a classification result by classify the candidate target based on the classifier and the feature data.

In some embodiments, the original image may include an X-ray image, a computer tomography (CT) image, a Positron Emission Tomography (PET) image, a Magnetic Resonance Imaging (MRI) image, an ultrasonic image, an electrocardiogram, or an electroencephalogram.

In some embodiments, the determining of the candidate target by segmenting the original image based on the at least two segmentation models may comprise: determining one or more first positioning regions by performing preliminary positioning on the original image; determining a second positioning region by performing threshold segmentation on the one or more first positioning regions based on Hessian dot-enhancement, the second positioning region including the candidate target and a background region, the candidate target including a substance region and a surrounding region that surrounds the substance region; determining the substance region of the candidate target based on the second positioning region and a statistical model; determining the surrounding region of the candidate target based on the statistical model and a morphological model; and determining the candidate target by combining the substance region and the surrounding region.

In some embodiments, the determining of the one or more first positioning regions by performing the preliminary positioning on the original image may comprise: receiving information regarding the one or more first positioning region from a use; determining, based on the received information, the one or more first positioning regions; determining the one or more first positioning regions using a region growing method by determining an axis that goes through the candidate target and selecting a seed point from the axis; or determining the one or more first positioning regions based on a detection processing.

In some embodiments, the statistical model may include a variational expectation maximization model.

In some embodiments, the determining of the substance region of the candidate target based on the second positioning region and the statistical model may comprise: processing, based on the variational expectation maximization model, the second positioning region to determine a probability graph; determining a pixel or voxel in the second positioning region corresponding to a pixel or voxel in the probability graph; determining that a probability value of the pixel or voxel is greater than the first threshold and the gray value of the pixel or voxel is greater than the second threshold; determining, in response to the determination the probability value of the pixel or voxel is greater than the first threshold, and the gray value of the pixel or voxel is greater than the second threshold, the pixel or voxel belongs to the substance region; determining that a probability value of the pixel or voxel is equal to or less than the first threshold, and a gray value of the pixel or voxel is equal to or less than the second threshold; and determining, in response to the determination the probability value of the pixel or voxel is equal to or less than the first threshold, and the pixel or voxel belongs to the background region.

In some embodiments, the morphological model may include a Hessian line-enhancement model.

In some embodiments, the determining of the surrounding region may comprise: processing the second positioning region, based on the Hessian line-enhancement model to determine a Hessian line-enhancement image; determining a pixel or voxel in the Hessian line-enhancement image corresponding to a pixel or voxel in the probability graph; determining that a probability value of the pixel or voxel is greater than the first threshold and a gray value of the pixel or voxel is less than the third threshold; determining, in response to the determination that the probability value of the pixel or voxel is greater than the first threshold and the gray value of the pixel or voxel is less than the third threshold, the pixel of voxel belongs to the surrounding region; determining that a probability value of the pixel or voxel is equal to or less than the first threshold and a gray value of the pixel or voxel is equal to or greater than the third threshold; and determining, in response to the determination that the probability value of the pixel or voxel is equal to or less than the first threshold and the gray value of the pixel or voxel is equal to or greater than the third threshold, the pixel of voxel belongs to the background region.

In some embodiments, spatial positions of pixels or voxels in the probability graph, the second positioning region, and the Hessian line-enhancement image may be corresponding.

According to a third aspect of the present disclosure, a system of training a classifier may comprise: an original data acquisition unit configured to acquire an original image; a candidate target determination unit configured to determine a candidate target by segmenting the original image based on at least two segmentation models; a first feature extraction unit configured to determining a universal set of features by extracting features from the candidate target; a feature selection unit configured to determining a reference subset of features by selecting features from the universal set of features; and a training unit configured to determining a classifier by performing classifier training based on the reference subset of features.

According to a fourth aspect of the present disclosure, a system of computer aided diagnosis may comprise: an original data acquisition unit configured to acquire an original image; a candidate target determination unit configured to determine a candidate target by segmenting the original image based on at least two segmentation models; a classifier acquisition unit configured to acquire a classifier including a reference subset of features; a second feature extraction unit configured to determine feature data by extracting features from the candidate target based on the reference subset of features; and a classification unit configured to determine a classification result by classify the candidate target based on the classifier and the feature data.

According to a fifth aspect of the present disclosure, a system of computer aided diagnosis may comprise: a message server cluster configured to distribute pending data; and a plurality of working nodes of a computer aided diagnosis server configured to acquire the pending data from the message server cluster and generate a processing result by processing the pending data in a streaming parallel method in real-time.

In some embodiments, the message server cluster may include a Kafka cluster.

In some embodiments, the pending data may be processed by a Storm cluster.

In some embodiments, the system may further comprise: a cluster management node configured to manage the Kafka cluster and the plurality of working nodes, wherein the cluster management node includes a Zookeeper cluster.

In some embodiments, the pending data may include an original medical image or intermedia data, and the intermedia data may include a region of interest (ROI), preprocessed data, a candidate target, or feature data.

According to a sixth aspect of the present disclosure, a method of computer aided diagnosis may comprise: managing a message server cluster and a plurality of working nodes of a computer aided diagnosis server to perform operations including: distributing pending data through the message server cluster in a streaming mode, wherein the pending data includes a region of interest (ROI), preprocessed data, a candidate target, or feature data; acquiring the pending data from the message server cluster through the plurality of working nodes of the computer aided diagnosis server; and processing the pending data in a streaming parallel mode in real time to generate a processing result.

According to a seventh aspect of the present disclosure, a medical system may comprise: an input device configured to acquire medical data; a computer aided diagnosis device configured to acquire the medical data from the input device, and an output device configured to output the processing result. The computer aided diagnosis device may comprise: a message server cluster configured to acquire the medical data from the input device; and a plurality of working nodes of a computer aided diagnosis server configured to acquire the pending data from the message server cluster and generate a processing result by processing the pending data in a streaming parallel method in real-time.

In some embodiments, the input device may include an imaging device configured to generate medical images, or a storage device configured to store data from the imaging device or data from the working nodes, the storage device includes at least one of a database, a PACS, or a file device.

In some embodiments, the system may further comprise: a cluster management node configured to manage the Kafka cluster and the plurality of working nodes, wherein the cluster management node includes a Zookeeper cluster.

BRIEF DESCRIPTION OF THE DRAWINGS

The present disclosure is further described in terms of exemplary embodiments. These exemplary embodiments are described in detail with reference to the drawings. These embodiments are non-limiting examples, in which like reference numerals represent similar structures throughout the several views of the drawings, and wherein:

FIG. 2-A is a block diagram illustrating an example of a computer aided diagnosis (CAD) system according to some embodiments of the present disclosure;

FIG. 2-B is a flowchart illustrating an exemplary process for a computer aided diagnosis (CAD) according to some embodiments of the present disclosure;

FIG. 4-A is a flowchart illustrating an exemplary process for determining a candidate target by a processing module according to some embodiments of the present disclosure;

FIG. 4-B is a flowchart illustrating an exemplary process for training a classifier by a processing module according to some embodiments of the present disclosure;

FIG. 4-C is a flowchart illustrating an exemplary process for performing classification based on a classifier by a processing module according to some embodiments of the present disclosure;

FIG. 10 is a schematic diagram for illustrating exemplary feature sources of feature extraction according to some embodiments of the present disclosure;

FIG. 13 is a schematic diagram illustrating an exemplary segmented result based on a real-time segmentation technique according to some embodiments of the present disclosure;

FIG. 14-A and FIG. 14-B are schematic diagrams illustrating exemplary segmented results based on a real-time segmentation technique according to some embodiments of the present disclosure;

FIG. 16-A is an exemplary original chest computed tomography (CT) image obtained through scanning a human body by a computed tomography (CT) device according to some present disclosure;

FIG. 16-B is an exemplary mask image relating to a pulmonary parenchyma according to some present disclosure;

FIG. 16-C is an exemplary segmented result relating to a pulmonary nodule according to some present disclosure;

FIG. 17 is a schematic diagram illustrating an example of a diagnosis result generated by a computer aided diagnosis (CAD) system according to some present disclosure; and FIGS. 18-A and 18-B are exemplary images of a breast lump region segmented by a region real-time segmentation algorithm according to some present disclosure.

DETAILED DESCRIPTION

Figure 1:
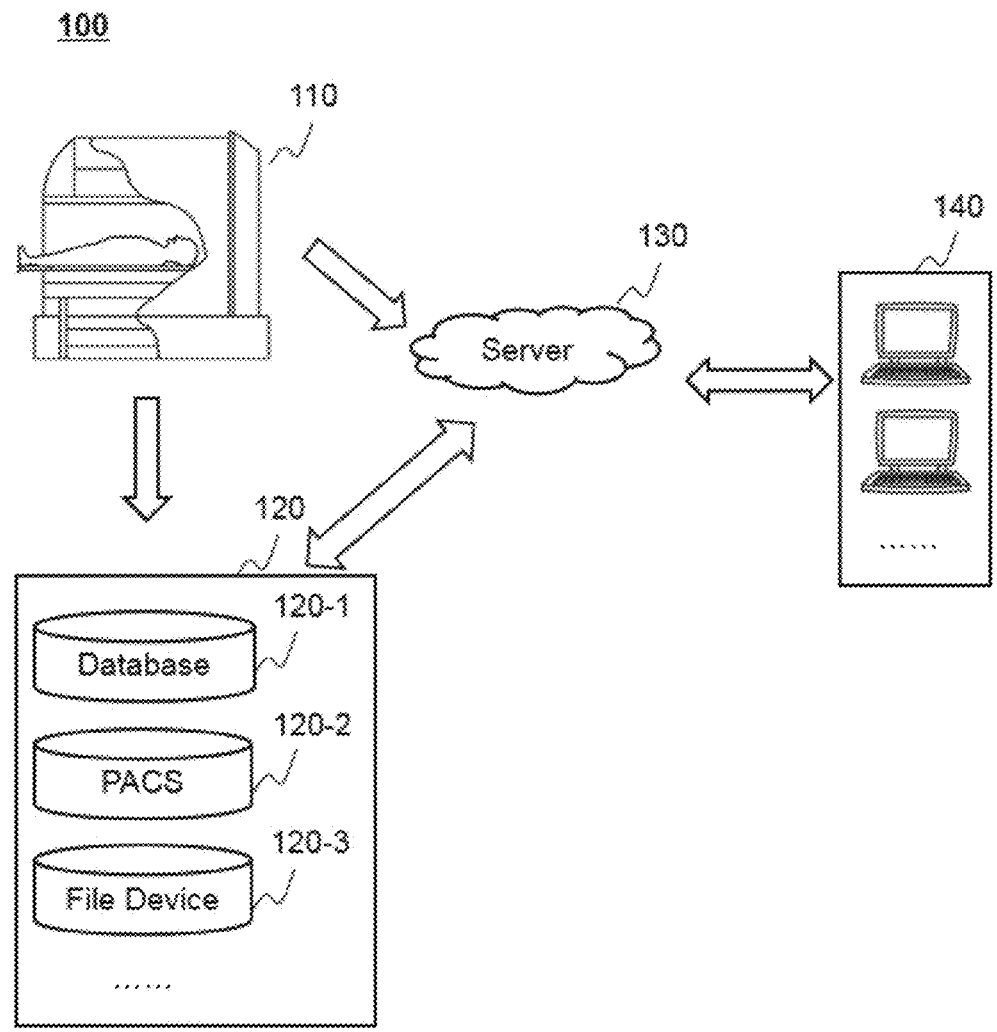
FIG. 1 is a schematic diagram of an exemplary computer aided diagnosis (CAD) system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. It should be noted that the embodiments in this disclosure are provided for the purpose of illustration, and not intended to limit the scope of the present disclosure. Unless stated otherwise or obvious from the context, the same reference numeral in the drawings refers to the same structure and operation.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Embodiments in the disclosure may be applied to a computer aided diagnosis (CAD) system. The CAD system may be used to detect lesions, display diagnosis results relating to the lesions to doctors, and support doctors to locate, diagnose and quantitatively analyze the lesions (e.g., a pulmonary nodule, a breast calcification, polyp, etc.) in medical images to reduce misdiagnoses and missed diagnoses and increase diagnose accuracy rate. Systems and methods for CAD described in the disclosure may be used by various imaging examination techniques, such as a computer tomography (CT), a magnetic resonance Imaging (MRI), a positron emission tomography (PET), an ultrasonic diagnosis, a plain film diagnosis, an X-ray imaging, an electrocardiograph (ECG) diagnosis, an electroencephalo-graph (EEG) diagnosis, etc. Systems and methods for CAD described in the disclosure may be used to detect and diagnose a breast, a chest, a lung nodule, a liver disease, a brain tumor, a colon, etc.

FIG. 1 is a schematic diagram of an exemplary computer aided diagnosis (CAD) system 100 according to some embodiments of the present disclosure. As shown, the CAD system 100 may include one or more imaging device 110, storage device 120, CAD server 130, and external device 140.

In some embodiments, the imaging device 110 may generate a medial image. In some embodiments, the medical image may be transmitted to the CAD server 130 for further processing, or stored in the storage device 120. The imaging device 110 may include a computer tomography (CT)

device, a magnetic resonance Imaging (MRI) device, a positron emission tomography (PET) device, an ultrasound imaging device, an X-ray imaging device, an ECG device, an EEG device, etc. The ultrasound imaging device may include a B-scan ultrasonography device, a color Doppler ultrasound device, a cardiac color ultrasound device, a three-dimensional color ultrasound device, etc.

In some embodiments, the storage device 120 may include any device with a function of storing. In some embodiments, the storage device 120 may store data acquired from the imaging device 110 (e.g., a medical image generated by the imaging device 110), or various data generated by the CAD server 130. In some embodiments, the storage device 120 may be local, or remote. The storage device 120 may include a database 120-1, picture archiving and communication systems (PACS) 120-2, a file device 120-3, or the like, or a combination thereof. The database 120-1 may include a hierarchical database, a network database, a relational database, or the like, or a combination thereof. The storage device 120 may digitize information and store the digitized information in an electric storage device, a magnetic storage device, an optical storage device, etc. The storage device 120 may store various information, such as procedures, data, etc. The storage device 120 may be a device that stores information using electric energy, such as a memorizer, a random access memory (RAM), a read only memory (ROM), or the like, or a combination thereof. The RAM may include a dekatron, a selectron, a delay line memory, a Williams tube, a dynamic random access memory (DRAM), a static random access memory (SRAM), a thyristor random access memory (T-RAM), a zero capacitor random access memory (Z-RAM), or the like, or a combination thereof. The ROM may include a read-only memory bubble memory, a magnetic button line memory, a memory thin film, a magnetic plate line memory, a core memory, a magnetic drum memory, a CD-ROM drive, a hard disk, a magnetic tape, an early nonvolatile memory (the NVRAM), a phase change memory, a magnetoresistive random access memory modules, a ferroelectric random access memory, a nonvolatile SRAM, a flash memory, a type of electronic erasing rewritable read-only memory, an erasable programmable read-only memory, a programmable read-only memory, a mask ROM, a floating connecting doors random access memory, a nanometer random access memory, a racetrack memory, a variable resistive memory, a programmable metallization cell, or the like, or a combination thereof. The storage device 120 may be a device that stores information using magnetic energy, such as a hard disk, a floppy disk, a magnetic tape, a magnetic core memory, a bubble memory, a U disk, a flash memory, or the like, or a combination thereof. The storage device 120 may be a device that stores information using optics energy, such as a CD, a DVD, or the like, or a combination thereof. The storage device 120 may be a device that stores information using magnetic-optics energy, such as a magneto-optical disk. The storage device 120 may store information in, for example, a random storage mode, a serial access storage mode, a read-only storage mode, or the like, or a combination thereof. In some embodiments, the storage device 120 may be a non-permanent memory, a permanent memory, or a combination thereof. It should be noted that the above description of storage devices is provided for the purpose of illustration, and not intended to limit the scope of the present disclosure.

The server 130 may process and/or analyze inputted data (e.g., a medical image acquired from the imaging device 110, the storage device 120, or the external device 140) and generate a result. For example, in a process for detecting pulmonary nodules, the server 130 may process and analyze an inputted medical image related to lungs, and output a detection result about whether the medical image includes a pulmonary nodule. As another example, in a process for diagnosing pulmonary nodules, the server 130 may process and analyze an inputted medical image related to lungs, and output a diagnosis result about whether the pulmonary nodule is benign or malignant.

In some embodiments, the server 130 may include a virtualized cluster work node (e.g., a storm work node). In some embodiments, the sever 130 may include one server, or a server group. The server group may be centralized (e.g., a data center), or distributed (e.g., a distributed system). The server 130 may include a cloud server, a file server, a database server, a FTP server, an application server, a proxy server, a mail server, or the like, or a combination thereof. The server 130 may be local, remote, or a combination thereof. In some embodiments, the server 130 may access information (e.g., a medical image) stored in the storage device 120, and/or information in the imaging device 110 (e.g., a medical image generated by the imaging device 110). In some embodiments, the server 130 may process data in serial by one workstation or one server. In some embodiments, the server 130 may process data in parallel. In the parallel processing, the data may be sent to one or more servers for processing concurrently by a cluster server as will be described in connection with FIG. 15.

The external device 140 may input data to the server 130, receive data output from the server 130, and display the outputted data in a form of digital, character, image, voice, etc. In some embodiments, the external device 140 may include an input device, an output device, or the like, or a combination thereof. The input device may include a character input device (e.g., a keyboard), an optical reading device (e.g., an optical mark reader or an optical character reader), a graphic input device (e.g., a mouse, a joystick, or a pen), an image input device (e.g., a camera, a scanner, a fax device, etc.), an analog input device (e.g., an analog-digital conversion in language recognition system), or the like, or a combination thereof. The output device may include a display device, a printer, a plotter, an image output device, a speech output device, a magnetic recording device, or the like, or a combination thereof. In some embodiments, the external device 140 may include an input device and an output device such as a desktop computer, a laptop, a smart phone, a tablet PC, a personal digital assistant (PDA), etc.

In some embodiments, the imaging device 110, the storage device 120, the server 130, and/or the external device 140 may be connected to and/or communicate with each other via a wireless connection, a wired connection, or a combination thereof.

It should be noted that the above description of the CAD system 100 is merely provided for the purposes of illustration, and not intended to limit the scope of the present disclosure. Many alternatives, modifications, and variations will be apparent to those skilled in the art. The features, structures, methods, and other features of the exemplary embodiments described herein may be combined in various ways to obtain additional and/or alternative exemplary embodiments. For example, the storage device 120 may be a cloud computing platform including a public cloud, a private cloud, a community and hybrid cloud, etc. However, those variations and modifications do not depart the scope of the present disclosure.

FIG. 2-A is a block diagram illustrating an example of a computer aided diagnosis (CAD) system according to some embodiments of the present disclosure. As shown, the server 130 may include a processing module 210, a storage module 220, an input module 230, and an output module 240. The modules or units in the server 130 may be local or remote.

In some embodiments, the input module 230 may receive data sent by the imaging device 110, the storage device 120, the storage module 220, or the external device 140. The data may include medical data. The medical data may include a medical image. The medical image may include an X-rays image, a CT image, a PET image, a MRI image, an ultrasound image, an ECG, an EEG, or the like, or a combination thereof. The medical image may be two-dimensional (2D), or three-dimensional (3D). The image format may include a joint photographic experts group (JPEG) format, a tagged medical image file format (TIFF) format, a graphics interchange format (GIF) format, a Kodak FlashPix (FPX) format, a digital imaging and communications in medicine (DICOM) format. The data may be input by handwriting, gesture, image, speech, video, electromagnetic wave, or the like, or a combination thereof. The data acquired by the input module 230 may be stored in the storage module 220, or may be processed and/or analyzed by the processing module 210.

In some embodiments, the output module 240 may output data processed and analyzed by the processing module 210. The data may include a detection and/or diagnosis result, or intermediate data generated during a detection and/or diagnosis processing. For example, in a process for detecting a pulmonary nodule, the processing module 210 may process and analyze a medical image. The intermediate data may include a segmentation result of a candidate nodule, feature data of a candidate nodule, etc. The detection result may indicate whether the medical image includes a pulmonary nodule. As another example, in a process for diagnosing a pulmonary nodule, the processing module 210 may process and analyze a medical image. The intermediate data may include a segmentation result of a candidate nodule, feature data of a candidate nodule, etc. The detection result may indicate whether the pulmonary nodule in the medical image is benign or malignant. The data may be in various format including a text, an audio, a video, an image, or the like, or a combination thereof. The outputted data may be transmitted to the external device 140, or may be transmitted to the storage device 120 or the storage module 220 for storing.

In some embodiments, the storage module 220 may store data from the processing module 210, the input module 230, and/or the output module 240. In some embodiments, the storage module 220 may be integrated in the system 100, or an external device of the system. The storage module 220 may exist in the system substantially, or perform a storage function by a cloud computing platform.

In some embodiments, the processing module 210 may process data. The processing module 210 may acquire the data from the input module 230 or the storage module 220. The processing module 210 may transmit the processed data to the storage device 120 or the storage module 220 for storing, or to the output module 240 for outputting the processed data. In some embodiments, the processing module 210 may process the data in a form of storing, classifying, filtering, transforming, calculating, searching, predicting, training, or the like, or a combination thereof. In some embodiments, the processing module 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a processor, a microprocessor, an advanced RISC machines processor (ARM), or the like, or a combinations thereof.

It should be noted that the processing module 210 may exist in the system 100 substantially, or perform a processing function via a cloud computing platform. The cloud computing platform may include a storage cloud platform for storing data, a computing cloud platform for processing data, and an integrated cloud computing platform for storing and processing data. The cloud platform configured in the system 100 may be a public cloud, a private cloud, or a hybrid cloud, or the like, or a combination thereof. For example, according to actual needs, some medical images received by the CAD system 100 may be calculated and/or stored by the cloud platform. Other medical images may be calculated and/or stored by a local processing module and/or a database in the system.

It should be noted that the system shown in FIG. 2-A may be implemented in various ways. In some embodiments, the system may be implemented by a hardware, a software, or a combination of the software and hardware. The hardware may be implemented by a special logic. The software may be stored in a storage device and may be implemented by a specific hardware, such as a microprocessor or a special design hardware. Those skilled in the art may understand that systems and methods described above may be implemented by computer-executable instructions and/or processor control codes, provided by, for example a disk, CD or DVD-ROM, a read-only memory (firmware) programmable memory or on a data carrier such as optical or electrical signal carrier. Systems and modules in the disclosure may be implemented by a hardware circuit of a programmable hardware device including a super larger scale integrated circle (LSI), a gate array, semiconductor logic chips, transistors, a field programmable gate array, programmable logic devices, etc., by a software executed by various processors, or by a combination of the hardware circuit and the software.

It should be noted that the above description of the CAD system 100 is merely provided for the purposes of illustration, and not intended to limit the scope of the present disclosure. Many alternatives, modifications, and variations will be apparent to those skilled in the art. Modules in the exemplary embodiments described herein may be combined in various ways, or to obtain additional and/or alternative exemplary embodiments. In some embodiments, the input module 230, the processing module 210, the output module 240, and the storage module 220 may exist in different modules of one system, or one module may perform functions of two or more modules. For example, the processing module 210 and the storage module 220 may be two modules, or integrated into one single module for processing and storing. As another example, each module may share one storage module, or each module may include a storage module respectively. However, those variations and modifications do not depart the scope of the present disclosure.

FIG. 2-B is a flowchart illustrating an exemplary process for a computer aided diagnosis (CAD) according to some embodiments of the present disclosure. In some embodiments, the process for the computer aided diagnosis (CAD) may be performed by the server 130.

In 252, original data may be acquired from the imaging device 110, the external device 140, the storage device 120, and/or the storage module 220. In some embodiments, the original data may include medical data. The medical data may include a medical image. The medical image may include an X-rays image, a CT image, a PET image, an MRI image, an ultrasound image, an ECG, an EEG, or the like, or a combination thereof. The medical image may be two-dimensional (2D), or three-dimensional (3D). The format of the medical image may include a joint photographic experts group (JPEG), a tagged medical image file format (TIFF), a graphics interchange format (GIF), a Kodak Flash Pix (FPX), a digital imaging communications in medicine (DI-COM), etc. The form of the original data may include a text, an audio, a video, an image, or the like, or a combination thereof.

In 254, the original data may be processed. In some embodiments, the processing of the original data may include storing, classifying, filtering, transforming, computing, searching, predicting, training, or the like, or a combination thereof.

For illustration purposes, a prediction model and a machine learning technique applied in some embodiments of processing the original data may be illustrated below. In some embodiments, the prediction model may be qualitative or quantitative. For example, the quantitative prediction model may include applying a time series prediction technique or a causal analysis technique. The time series prediction technique may include an average smoothing technique, a trend extrapolation technique, a seasonal conversion prediction technique, a Markov prediction technique, or the like, or a combination thereof. The causal analysis technique may include a unitary regression technique, a multiple regression technique, an input-output analysis technique, or the like, or a combination thereof. In some embodiments, the prediction model may include a weighted arithmetic average model, a trend average prediction model, an exponential smoothing model, an average growth rate model, a unitary linear regression model, a high and low point mode, or the like, or a combination thereof.

In some embodiments, equations, algorithms and/or models applied in processing data may be optimized based on the machine learning technique. The machine learning technique according to a learning mechanism may include a supervised learning, an unsupervised learning, a semi-supervised learning, reinforcement learning, or the like, or a combination thereof. In some embodiments, the machine learning technique may include a regression algorithm, a case learning algorithm, a formal learning algorithm, a decision tree learning algorithm, a Bayesian learning algorithm, a kernel learning algorithm, a clustering algorithm, an association rules learning algorithm, a neural network learning algorithm, a deep learning algorithm, a dimension reduction algorithm, etc. The regression algorithm may include a logistic regression algorithm, a stepwise regression algorithm, a multivariate adaptive regression splines algorithm, a locally estimated scatterplot smoothing algorithm, etc. The case learning algorithm may include a k-nearest neighbor algorithm, a learning vector quantization algorithm, a self-organizing map algorithm, etc. The formal learning algorithm may include a ridge regression algorithm, a least absolute shrinkage and selection operator (LAASSO) algorithm, an elastic net algorithm, etc. The decision tree learning algorithm may include a classification and regression tree algorithm, an iterative dichotomiser 3 (ID3) algorithm, a C4.5 algorithm, a chi-squared automatic interaction detection (CHAID) algorithm, a decision stump algorithm, a random forest algorithm, a mars algorithm, a gradient boosting machine (GBM) algorithm, etc. The Bayesian learning algorithm may include a naive Bayesian algorithm, an averaged one-dependence estimators algorithm, a Bayesian belief network (BBN) algorithm, etc. The kernel learning algorithm may include a support vector machine algorithm, a linear discriminate analysis algorithm, etc. The neural network learning algorithm may include a perceptron neural network algorithm, a back propagation algorithm, a Hopfield network algorithm, a self-organizing map (SOM) algorithm, a learning vector quantization algorithm, etc. The deep learning algorithm may include a restricted Boltzmann machine algorithm, a deep belief networks (DBN) algorithm, a convolutional neural network algorithm, a stacked auto-encoders algorithm, etc. The dimension reduction algorithm may include a principle component analysis algorithm, a partial least square regression algorithm, a Sammon mapping algorithm, a multi-dimensional scaling algorithm, a projection pursuit algorithm, etc.

In 256, a processing result may be output. In some embodiments, the processing result may be transmitted to the external device 140, or stored in the storage device 120 or the storage module 220. In some embodiments, the form of the processing result may include a text, an image, an audio, a video, or the like, or a combination thereof.

It should be noted that the flowchart depicted above is provided for the purposes of the illustration, and not intended to limit the scope of the present disclosure. For persons having ordinary skills in the art, various variations and modification may be conducted under the teaching of the present disclosure. For example, one or more operations may be omitted or added. For example, the original data may be preprocessed. The preprocessing may include removing fuzzy data by a data cleaning, a data integration, a data transformation, a data specification, etc. In some embodiments, the fuzzy data may be removed based on a discriminant technique, an elimination technique, an average technique, a smoothing technique, a proportion technique, a moving average technique, an exponential smoothing technique, a difference technique, etc. As another example, the process for the CAD may include a step for storing data. However, those variations and modifications may not depart the scope of the present disclosure.

Figure 3:
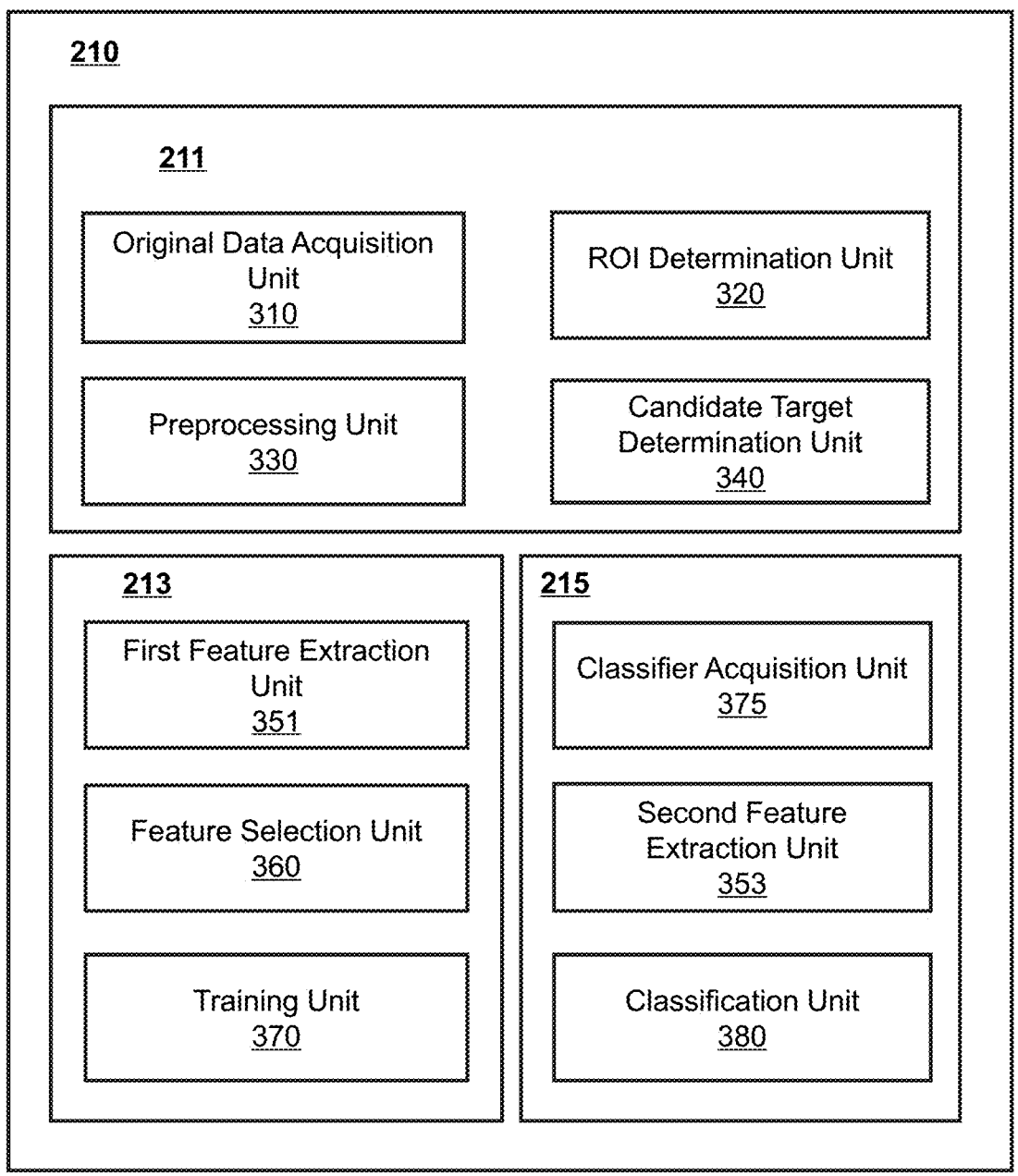
FIG. 3 is a block diagram illustrating an example of a processing module in the CAD system according to some embodiments of the present disclosure.

FIG. 3 is a block diagram illustrating an example of a processing module 210 in the server 130 according to some embodiments of the present disclosure. As shown, the processing module 210 may include an object determination sub-module 211, a training sub-module 213, and a classification sub-module 215. The object determination sub-module 211 may determine a candidate target (e.g., a suspected pulmonary nodule). The training sub-module 213 may train a classifier based on the determined candidate target. The classification sub-module 215 may classify the candidate target. For example, the classification sub-module 215 may determine whether a suspected pulmonary nodule is a true pulmonary nodule, or determine whether a true pulmonary nodule is benign or malignant. In some embodiments, besides the sub-modules described above, the processing module 210 may include one or more other modules or units. The modules 310-380 may be connected to or communicate with each other via a wired connection or a wireless connection.

The object determination sub-module 211 may include an original data acquisition unit 310, a region of interest (ROI) determination unit 320, a preprocessing unit 330, and a candidate target determination unit 340.

The original data acquisition unit 310 may obtain original data. In some embodiments, the original data may include medical data. The medical data may include a medical image. The medical image may include an X-rays image, a CT image, a PET image, a MRI image, an ultrasound image, an ECG, an EEG, or the like, or a combination thereof. The medical image may be two-dimensional (2D), or three-dimensional (3D). The image format may include a joint photographic experts group (JPEG) format, a tagged medical image file format (TIFF) format, a graphics interchange format (GIF) format, a Kodak FlashPix (FPX) format, a digital imaging and communications in medicine (DICOM) format. In some embodiments, the original data acquisition unit 310 may acquire the original data from the imaging device 110, the external device 140, the storage device 120, and/or the storage module 220. In some embodiments, the original data may be acquired in real time, or non-real time. In some embodiments, the acquired original data may be stored in the storage device 120, the storage module 220, and/or any other storage device integrated in or independent from the system as described elsewhere in the disclosure. In some embodiments, the original data acquired by the original data acquisition unit 310 may be transmitted to other modules, sub-modules, units and/or sub-units for further processing. For example, the original data acquisition unit 310 may transmit the original data to the ROI determination unit 320 to determine a ROI. As another example, the original data may be transmitted to the preprocessing unit 330 for preprocessing. As another example, the original data acquisition unit 310 may transmit the original data to the candidate target determination unit 340 to determine a candidate target.

The ROI determination unit 320 may determine a ROI based on the original data. In some embodiments, the ROI may include a candidate target. For example, in a process for detecting pulmonary nodules in a medical image, the ROI may include a pulmonary parenchyma region in the medical image. The lungs may include pulmonary parenchyma and pulmonary mesenchyme. The pulmonary parenchyma may include different levels branches of bronchi and alveoli at the terminal of the bronchi. The pulmonary mesenchyme may include connective tissues, blood vessels, lymphatic vessels, nerves, etc. In some embodiments, data processed by the ROI determination unit 320 may be transmitted to other modules, sub-modules, units, and/or sub-units for further processing. For example, the ROI determination unit 320 may transmit the processed data to the preprocessing unit 330 for preprocessing. As another example, the ROI determination unit 320 may transmit the processed data to the candidate target determination unit 340 to determine a candidate target.

The preprocessing unit 330 may preprocess the original data and/or the ROI. In some embodiments, the preprocessing may include preliminary positioning, enhancement processing, interpolation processing, morphology processing, denoising processing, or the like, or a combination thereof. The preliminary positioning may be performed to determine a rough region of a candidate target in the original data (e.g., an original medical image) or the ROI to simplify the process of determining the candidate target and play a basic role in the process of determining the candidate target. The preliminary positioning may be performed automatically, semi-automatically, manually, etc. The enhancement processing may be performed to highlight a structure or region in the original data (e.g., an original medical image) or an ROI. The enhancement processing may include a Hessian dot-enhancement, a Hessian line-enhancement, or the like, or a combination thereof. The interpolation processing may be performed to balance voxel sizes in the original data (e.g., an original medical image) or an ROI. The morphology processing may be performed to analyze and identify a target by processing a shape of a structure in the original data (e.g., an original medical image) or an ROI based on an element with a specific morphological structure. The morphology processing may include an expansion operation, a corrosion operation, an open operation, a closed operation, or the like, or a combination thereof. The denoising operation may be performed to remove noise caused by machines and/or object motions in the original data (e.g., an original medical image) or an ROI. In some embodiments, the preprocessed data may be transmitted to other modules, sub-modules, units, and/or sub-units for further processing. For example, the preprocessed data may be transmitted to the candidate target determination unit 340 to determine a candidate target.

The candidate determination unit 340 may determine a candidate target. In a process for detecting pulmonary nodules, the candidate target may be suspected pulmonary nodules. In a process for detecting breast lumps, the candidate target may be suspected breast lumps. In some embodiments, data processed by the candidate target determination unit 340 may be transmitted to any other module, sub-module, unit and/or sub-unit for further processing. For example, data processed by the candidate determination unit 340 may be transmitted to the first feature extraction unit 351 and/or the second feature extraction unit 353 to extract features.

The training sub-module 213 may include a first feature extraction unit 351, a feature selection unit 360, and a training unit 370.

The first feature extraction unit 351 may extract features from a candidate target in a training process. In some embodiments, the features may be used to distinguish a target from other targets. The features may be data exacted through processing and/or measuring the target. For example, in a process for detecting pulmonary nodules, the candidate target may be pulmonary nodules. The features may include a gray value related feature, a morphological feature, a texture feature, a serial section feature, or the like, or a combination thereof. The gray value related feature may include a mean gray value, a gray value variance, etc. The mean gray value may denote an average gray value of the gray values of all pixels in a suspected pulmonary nodule. The gray value variance may denote the intensity of change in gray values of pixels in a suspected pulmonary nodule.

In a 2D image, the morphological feature may include an area, a perimeter, a centroid, a diameter, a curvature, an eccentricity, a roundness, a compactness, a Fourier descriptor, a shape moment descriptor, or the like, or a combination thereof. The area may denote a pixel number in a candidate target region. The perimeter may denote a pixel number on the boundary of a candidate target. The centroid may denote an abscissa average value and an ordinate average value corresponding to all the pixels in a candidate target region. The diameter may denote a distance between any two pixels on the boundary of a candidate target. The eccentricity may denote an extent in which a candidate target is close to a circle. The roundness may measure a roundness of a candidate target. The compactness may denote the boundary smoothness of a candidate target. The Fourier descriptor may be used to determine whether a target (e.g., an isolated pulmonary nodule) has burr characterization. The shape moment descriptor may denote the boundary shape of a target (e.g., a pulmonary nodule).

In a 3D image, the feature may include a volume, a perimeter, a centroid, a diameter, a curvature, an eccentricity, a sphericity, a compactness, a Fourier descriptor, a shape moment descriptor, or the like, or a combination thereof. The volume may denote the number of voxels in a candidate target region. The sphericity may measure the sphericity of a candidate target. In a 2D and/or 3D image, the texture feature may include a statistic magnitude, a boundary clarity factor, a frequency domain parameter, etc. The statistic magnitude may be used to assess the spatial correlation between the change in gray values and pixels or voxels in an image. The boundary clarity factor may denote a boundary clarity of a target (e.g., a pulmonary nodule). The statistic magnitude and the boundary clarity factor may denote a suspected target (e.g., a pulmonary nodule) in the spatial domain. The frequency domain parameter may denote a suspected target (e.g., a pulmonary nodule) in the frequency domain. In some embodiments, the first feature extraction unit 351 may extract all features of a candidate target for generating a universal set of features. A reference subset of features may be extracted from the universal set of features.

The feature selection unit 360 may generate a reference subset of features by selecting features from the extracted features. The reference subset of features may be used to train a classifier. In some embodiments, the extracted features may be transmitted to any other module, sub-module, unit, and/or sub-unit for further processing. For example, the extracted features may be transmitted to the feature selection unit 360 to select features.

The training unit 370 may train a classifier. In some embodiments, a process for training a classifier may include deriving a classification function or generating a classification model based on acquired data. The classification function or the classification model may also be referred to as a classifier. In some embodiments, the classifier trained by the training unit 370 may be transmitted to any other module, sub-module, unit, and/or sub-unit for further processing. For example, the training unit 370 may transmit the classifier to the classification unit 380 for classification.

The classification sub-module 215 may include a classifier acquisition unit 375, a second feature extraction unit 353, and a classification unit 380.

The classifier acquisition unit 375 may acquire a classifier. The classifier may include a reference subset of features.

The second feature extraction unit 353 may extract features from a candidate target. In some embodiments, the second feature extraction unit 353 may extract the features from the candidate target based on the reference subset of features.

The classification unit 380 may generate a classification result by classifying a candidate target according to the extracted features from the candidate target. In some embodiments, a classification process may include performing data prediction by mapping features of a candidate target to a specific category based on a classification model or function. A classifier may correspond to a classification technique. In some embodiments, the classification technique may include a supervised technique. The supervised technique may include identifying a pending sample according to a specific rule and element features of the pending sample, and classifying the element features of the pending sample into a category of training samples based on similar features to the pending sample. The supervised technique may include a linear discriminant algorithm, an artificial neural network algorithm, a Bayes classification algorithm, a support vector machine (SVM) algorithm, a decision tree algorithm, a logistic regression algorithm, or the like, or a combination thereof.

For example, in a process for detecting a pulmonary nodule, a classification result may include whether the suspected pulmonary nodule is a true pulmonary nodule. As another example, in a process for diagnosing a pulmonary nodule, a classification result may include whether the pulmonary nodule is benign or malignant. In some embodiments, the classification result may be expressed as a probability. For example, in a process for detecting a pulmonary nodule, a classification result may include a probability of the suspected pulmonary nodule to be a true pulmonary nodule. As another example, in a process for diagnosing a pulmonary nodule, a classification result may include a probability of the pulmonary nodule to be malignant.

In some embodiments, data generated by the object determination sub-module 211, the training sub-module 213, and/or the classification sub-module 215 may be transmitted to any other module, unit, and/or sub-unit for further processing. The data may be stored in the storage device 120 and/or the storage module 20, or may be output to the external device 140 by the output module 240.

In some embodiments, the processing module 210 may include one or more storage modules (not shown in FIG. 3). The storage modules may store information and intermediate data extracted, determined, and/or generated by each sub-module and/or unit. In some embodiments, the sub-modules 211, 213, and 215 in the processing module 210 may include one or more storage units (not shown in FIG. 3) for storing information and intermediate data.

In some embodiments, the sub-modules 211, 213, and 215 in the processing module 210 may perform an operation or processing based on a logic operation (e.g., AND, OR, NOT operation, etc.), a numerical operation, or the like, or a combination thereof. The units 310-380 in the processing module 210 may include one or more processors. The processors may include any general processor. For example, the processors may include a programmable logic device (PLD), an application specific integrated circuit (ASIC), a microprocessor, a system chip (SoC), a digital signal processor (DSP), etc. In some embodiments, two or more units of the units 310-380 may be integrated on one, two, or more hardware independently. It should be appreciated that the sub-modules 211, 213, and 215 in the processing module 210 may be implemented in various forms. For example, the system may be implemented by a hardware, a software, or a combination thereof. The hardware may include a super LSI, a gate array, a semiconductor logic chip, a transistor, a field programmable gate array, a programmable logic device, or the like, or a combination thereof. The software may be implemented by various processors.

In some embodiments, the training sub-module 213 may be an off-line module that may perform the training of a classifier offline.

It should be noted that the description for the processing module 210 above is provided for the purposes of the illustration, and not intended to limit the scope of the present disclosure. Many alternatives, modifications, and variations to the processing module 210 will be apparent to those skilled in the art. The features, structures, methods, and other features of the exemplary embodiments described herein may be combined in various ways to obtain additional and/or alternative exemplary embodiments. For example, the ROI determination unit 320 and/or the preprocessing unit 330 may be omitted. As another example, the first feature extraction unit 351 and the second feature extraction unit 353 may be integrated into one single unit for extracting features. However, those variations and modifications do not depart the scope of the present disclosure.

FIG. 4-A is a flowchart illustrating an exemplary process for determining a candidate target by a processing module 210 according to some embodiments of the present disclosure. In 412, original data may be acquired. Operation 412 may be performed by the original data acquisition unit 310. The original data may include medical data. In some embodiments, the medical data may include a medical image. The medical image may include an X-rays image, a CT image, a PET image, a MRI image, an ultrasound image, an ECG, an EEG, or the like, or a combination thereof. The medical image may be two-dimensional (2D), or three-dimensional (3D). The image format may include a joint photographic experts group (JPEG) format, a tagged medical image file format (TIFF) format, a graphics interchange format (GIF) format, a Kodak FlashPix (FPX) format, a digital imaging and communications in medicine (DICOM) format. In some embodiments, the original data may be acquired from the imaging device 110, the storage device 120, the storage module 220, or the external device 140.

In 414, a first region of interest (ROI) may be determined based on the original data. Operation 414 may be performed by the ROI determination unit 320. In some embodiments, the range for determining a candidate target may be shrank before determining the candidate target to reduce the difficulty and complexity for determining the candidate target. In some embodiments, the ROI may include a candidate target. For example, in a process for detecting a pulmonary nodule, the ROI may include a pulmonary parenchyma region in a medical image. The determination of the pulmonary parenchyma region may include extracting information in the pulmonary parenchyma region and remove information out of the pulmonary parenchyma region, such as lung cavity, clothes, fat, or other interference factors. In some embodiments, the ROI may be determined based on a thresholding algorithm, a region growing algorithm, an edge detection algorithm, a morphology processing algorithm, a multi-scale analysis algorithm, a pattern analysis algorithm, a clustering algorithm, or the like, or a combination thereof. In some embodiments, the image generated by determining the ROI may be a mask image (as shown in FIG. 17-B) if the original data is a medical image. In some embodiments, the generation of the mask image may include multiplying a predetermined ROI mask image by the medical image. Then the pixel or voxel value corresponding to a pixel or voxel in the ROI may be constant, and the pixel or voxel value corresponding to a pixel or voxel out of the ROI may be 0. As used herein, the pixel or voxel value may denote a color value of a pixel or voxel in an image. For a monochrome image, the pixel or voxel value may denote a gray value of a pixel or voxel in an image.

In 416, a candidate target or a second region of interest (ROI) may be determined by preprocessing the first ROI. Operation 416 may be performed by the preprocessing unit 330. In some embodiments, the preprocessing may include preliminary positioning, enhancement processing, interpolation processing, morphology processing, etc. The preliminary positioning may be performed to determine an approximate region of a candidate target in the first ROI to simplify the process of determining the candidate target and play a basic role in the process for determining the candidate target. The preliminary positioning may be performed automatically, semi-automatically, manually, etc. The enhancement processing may be performed to highlight a structure or region in the ROI. The enhancement processing may include a Hessian dot-enhancement, a Hessian line-enhancement, or the like, or a combination thereof. The interpolation processing may be performed to balance voxels sizes in the ROI. The morphology processing may be performed to analyze and identify a target by processing a shape of a structure in the ROI based on an element with a specific morphological structure. The morphology processing may include an expansion operation, a corrosion operation, an open operation, a closed operation, or the like, or a combination thereof.

In 418, a candidate target may be determined by segmenting the preprocessed data based on one or more segmentation models. Operation 418 may be performed by the candidate target determination unit 340. In some embodiments, the segmentation may include dividing an image into several portions based on a specific uniformity (or consistency) principle, such that each portion may satisfy the specific consistency. In some embodiments, the segmentation may also refer to a classification of pixels or voxels in an image. In some embodiments, a segmentation model may correspond to a segmentation technique. In some embodiments, the segmentation model may include a threshold segmentation model, a region growing segmentation model, a watershed segmentation model, a statistical segmentation model, a morphological segmentation model, or the like, or a combination thereof. The threshold segmentation model may include classifying pixels or voxels in an image into different types by setting different thresholds. The threshold segmentation model may include a single threshold segmentation model and/or a multi-threshold segmentation model according to the number of thresholds. The threshold segmentation model may include an iterative threshold segmentation model, a histogram segmentation model, or the Otsu segmentation algorithm. The region growing segmentation model may start from a growing point (e.g., a single pixel or voxel, or a region) and merge adjacent pixels or voxels including one or more similar features such as gray value, texture, color, etc. to the growing point into a same region. The region growing segmentation model may include an iterative process of adding a new pixel or voxel in to the growing region. The iterative process may end until there is no near point to be merged into the growing region. The watershed segmentation model may include an iterative labeling process. The gray level of each pixel or voxel may be ranked from low to high, then in a submergence process from low to high, each local minimum value may be determined and labeled by applying a first-in first-out (FIFO) structure in an h order domain of influence. The morphological segmentation model may include a Hessian dot-enhancement model, a Hessian-line enhancement model, a multi-scale Gaussian template matching model, a multi-scale morphological filtering model, etc. The Hessian dot-enhancement model may be applied to enhance, for example, a dot and/or an approximate dot in an image. The Hessian dot-enhancement model may be applied to enhance a line-type graph in an image. The multi-scale Gaussian template matching model may be applied to segment an image based on the morphology of a candidate target. For example, the multi-scale Gaussian template matching model may be applied to segment pulmonary nodules based on the approximate round morphology of the pulmonary nodules. The multi-scale morphological filtering model may apply various mathematical morphology techniques to perform a filtering operation on an image. An edge-based segmentation model may include a level set algorithm. The statistical segmentation model may include a variational expectation maximization, a K-means model, a Fuzzy C-means model, or the like, or a combination thereof.

In some embodiments, the preprocessed data may be segmented based on one segmentation model, or multi-segmentation models for determining a candidate target. The emphasis of different segmentation models may be different when the preprocessed data is segmented based on the multi-segmentation models. For example, the morphological segmentation model (e.g., a morphology-based region growing segmentation model) may segment an image based on gray values of pixels or voxels to obtain a segmentation result with a fixed morphology. The statistical segmentation model (e.g., a VEM model) may segment an image based on the gray value distribution of pixels or voxels. The candidate target determined by segmenting a same image region based on different models may be different. The combination of different models may be complementary. For example, a pulmonary nodule may be a solid nodule, a mixed ground glass nodule, a ground glass nodule, etc. The pulmonary nodule may not be identified based on the morphological segmentation model effectively. The combination of the morphological segmentation model and the statistical segmentation model may identify the pulmonary nodules effectively. For example, multiple candidate targets may be determined by processing a same region based on different segmentation models. The multiple candidate targets may be complementary by each other. The universal set of features of the candidate targets may be exacted from the multiple candidate targets. The universal set of features may include more effective feature information and enlarge the range of the universal set of features.

In a process for detecting a pulmonary nodule, the candidate target may include a suspected pulmonary nodule. In a process for detecting a breast lump, the candidate target may include a suspected breast lump.

It should be noted that the flowchart for determining a candidate target depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure. For example, a denoising operation may be performed between operation 412 and operation 414 for removing noise in the original data. As another example, operation 414 or operation 416 may be omitted. In some embodiments, an enhancement operation may be added after operation 418 for enhancing the determined candidate target. In some embodiments, other selection conditions may be added between two operations. For example, a result generated by any one operation may be stored or be backed up.

FIG. 4-B is a flowchart illustrating an exemplary process for training a classifier by a processing module 210 according to some embodiments of the present disclosure.

In 422, a target to be processed may be acquired. Operation 412 may be performed by the first feature extraction unit 351. In some embodiments, the target to be processed may include a candidate target, a true target, original data, or preprocessed data. The preprocessed data may include an interpolation image, a Hessian dot-enhanced image, a Hessian line-enhancement image, a morphology image, or the like, or a combination thereof. For example, the candidate target may be a suspected pulmonary nodule in a process for training a classifier for detecting a pulmonary nodule. The candidate target may be a true pulmonary nodule in a process for training a classifier for diagnosing a pulmonary nodule.

In 424, a universal set of features may be determined by extracting features from the target to be processed. Operation 424 may be performed by the first feature extraction unit 351. In some embodiments, the features may be extracted for classifying a target from other targets through processing and/or measuring the target. For example, in a process for detecting a pulmonary nodule, the candidate target may be a suspected pulmonary nodule. The features may include a gray value related feature, a morphological feature, a texture feature, a serial slice feature, or the like, or a combination thereof. The gray value related feature may include a mean gray value, a gray value variance, or the like, or a combination thereof. The morphological feature in a 2D image may include may include an area, a perimeter, a centroid, a diameter, a curvature, an eccentricity, a roundness, a compactness, a Fourier descriptor, a shape moment descriptor, or the like, or a combination thereof. The morphological feature in a 3D image may include a volume, a perimeter, a centroid, a diameter, a curvature, an eccentricity, a sphericity, a compactness, a Fourier descriptor, a shape moment descriptor, or the like, or a combination thereof. In some embodiments, the universal set of features may include all features associated with the target. In some embodiments, the universal set of features may be extracted based on original data, an ROI, or preprocessed data. In some embodiments, the universal set of features may include features extracted from the candidate target, features extracted from the original data, features extracted from the preprocessed data, or the like, or a combination thereof. In some embodiments, the universal set of features may include non-image data. The non-image data may include medical history data, clinical trial results, symptoms, physiological data, pathological data, genetic data, or the like, or a combination thereof. For example, the non-image data for detecting a pulmonary nodule may include age, gender, smoking history, cancer history, family history, occupation exposure, leisure exposure, previous lung disease, current lung disease, previous thoracic surgery, the number of satellite lesions around diagnosed lesions, lymph node size, suspicious lesions, lesions location in the lung, or the like, or a combination thereof.

In 426, a reference subset of features may be determined by selecting features from the universal set of features. Operation 426 may be performed by the first feature extraction unit 351. In some embodiments, the purpose of selecting features may be to improve the accuracy of a classifier. In some embodiments, in the process of selecting features, for different purposes, features in the universal set of features that are important for classifying the target may be selected as features in the reference subset of features. For example, in a process for detecting a pulmonary nodule, the classification may determine whether a suspected pulmonary nodule is a true pulmonary nodule. Features (e.g., a mean gray value, a gray variance, etc.) important for determining the true pulmonary nodule may be selected, and features (e.g., a frequency domain parameters feature) without much impact on determination of the true pulmonary nodule may not be selected. In a process for diagnosing a pulmonary nodule, the classification may determine whether the pulmonary nodule is benign or malignant. Features (e.g., a boundary clarity factor) important for determining a benign or malignant pulmonary nodule may be selected, and features (e.g., a circularity, a sphericity, etc.) without much impact on the determination of the benign or malignant pulmonary nodule may not be selected. The features may be selected based on an exhaustive algorithm, a heuristic algorithm, a random algorithm, or the like, or a combination thereof. The random algorithm may include a genetic algorithm, a particle swarm algorithm, a simulated annealing algorithm, etc. The exhaustive algorithm may include a breadth first search algorithm, a depth first search algorithm, etc. The heuristic algorithm may include a decision tree algorithm, a Relief algorithm, a forward (backward) algorithm, etc.

In 428, a classifier may be determined by training a classifier based on the reference subset of features. Operation 428 may be performed by the training unit 370. In some embodiments, the classifier training may include deriving a classification function or establish a classification model based on existing data. The classification function or the classification model may also be referred to as a classifier. In some embodiments, the classifier training may include determining a training sample including a positive sample and a negative sample, extracting features from the training sample based on the reference subset of features, performing a training algorithm on the extracted features from the training sample for generating a classification function or model. The classification function or model may be also referred to as a classifier. In some embodiments, the positive sample may include the target to be processed and the negative sample may not include the target to be processed. For example, the positive sample may include a pulmonary nodule and the negative sample may not include the pulmonary nodule for training a classifier used to determine a true pulmonary nodule. As another example, the positive sample may include a benign pulmonary nodule (or a malignant pulmonary nodule) and the negative sample may not include a benign pulmonary nodule (or a malignant pulmonary nodule) if the classifier is used to determine a benign or malignant pulmonary nodule. In some embodiments, the classifier trained based on the reference subset of features may include the reference subset of features.

In some embodiments, if the target to be processed acquired in 422 is a candidate target, the classifier determined in 428 may include a detection classifier. The detection classifier may determine whether the candidate target is a true target. If the target to be processed acquired in 422 is a true target, the classifier determined in 428 may include a diagnosis classifier. The diagnosing classifier may determine the property of the true target (e.g., benign or malignant). For example, if the target to be processed acquired in 422 is a suspected pulmonary nodule, the classifier determined in 428 may include a detection classifier. The detection classifier may determine whether the suspected pulmonary nodule is a true pulmonary nodule. If the target to be processed acquired in 422 is a true pulmonary nodule, the classifier determined in 428 may include a diagnosing classifier. The diagnosing classifier may determine whether the true pulmonary nodule is benign or malignant.

FIG. 4-C is a flowchart illustrating an exemplary process for performing classification based on a classifier by a processing module 210 according to some embodiments of the present disclosure. In 432, a target to be processed may be acquired. Operation 432 may be performed by the second feature extraction unit 353. In some embodiments, the target to be processed may include a candidate target, a true target, original data, or preprocessed data. The preprocessed data may include an interpolation image, a Hessian dot-enhanced image, a Hessian line-enhancement image, a morphology image, or the like, or a combination thereof. For example, in a process for detecting a pulmonary nodule, the candidate target may be a suspected pulmonary nodule. In a process for diagnosing a pulmonary nodule, the candidate target may be a true pulmonary nodule.

In 434, a classifier including a reference subset of features may be acquired. Operation 434 may be performed by the classifier acquisition unit 375. In some embodiments, the classifier may be determined as described in connection with FIG. 4-B. In some embodiments, the reference subset of features may include two classification indicators. The first classification indicator may include a feature type determined in a process for selecting features. The second classification indicator may include a category indicator for classifying features. For example, in a process for classifying features, a quantized value corresponding to a specific feature may be compared with the category indicator to determine the category of the specific feature.

In 436, feature data may be determined by extracting features from the target to be processed based on the reference subset of features. Operation 436 may be performed by the second feature extraction unit 353.

In 438, a classification result may be determined by classifying the target to be processed based on the classifier and the feature data. Operation 438 may be performed by the classification unit 380. In some embodiments, a classifying processing may include performing data prediction by mapping features of a candidate target to a specific category based on a classification model or function. In some embodiments, the classification of the target to be processed may include comparing a quantized value corresponding to the feature data in the reference subset of features with a category indicator, determining the type of the feature data, and determining the type of the target to be processed. In some embodiments, a classifier may correspond to a classification technique. In some embodiments, the classification technique may include a supervised technique. The supervised technique may include identifying a pending sample according to a specific rule and element features of the pending sample, and classifying the element features of the pending sample into a category of training samples based on similar features to the pending sample. The supervised technique may include a linear discriminant algorithm, an artificial neural network algorithm, a Bayes classification algorithm, a support vector machine (SVM) algorithm, a decision tree algorithm, a logistic regression algorithm, or the like, or a combination thereof. For example, in a process for detecting a pulmonary nodule, a classification result may include whether the suspected pulmonary nodule is a true pulmonary nodule. As another example, in a process for diagnosing a pulmonary nodule, a classification result may include whether the pulmonary nodule is benign or malignant. In some embodiments, the classification result may be expressed as a probability. For example, in a process for detecting a pulmonary nodule, a classification result may include a probability of the suspected pulmonary nodule to be a true pulmonary nodule. As another example, in a process for diagnosing a pulmonary nodule, a classification result may include a probability of the pulmonary nodule to be malignant.

In some embodiments, if the target to be processed acquired in 432 is a candidate target, the classification process may be referred to as a detection process. The detection process may be performed to determine whether a candidate target is a true target. If the target to be processed acquired in 432 is a true target, the classification process may be referred to as a diagnosing process. The diagnosis process may be performed to determine a property of the true target. For example, if the target to be processed acquired in 432 is a suspected pulmonary nodule, the classification process may be referred to as a detecting process. The detecting process may be performed to determine whether the suspected pulmonary nodule is a pulmonary nodule. As another example, if the target to be processed acquired in 432 is a pulmonary nodule, the classification process may be referred to as a diagnosis process. The diagnosis process may be performed to determine whether the pulmonary nodule is benign or malignant.

In some embodiments, the process described in FIG. 4-B may be performed to train a detection classifier or a diagnosis classifier. For example, if the target to be processed acquired in 422 is a candidate target, the process described in FIG. 4-B may be performed to train a detection classifier. The candidate target may be determined according to the process described in connection with FIG. 4-A. As another example, if the target to be processed acquired in 432 is a candidate target, the process described in FIG. 4-C may be performed to detect the candidate target. The candidate target may be determined according to the process described in connection with FIG. 4-A.

In some embodiments, the process described in FIG. 4-B may be combined with the process described in FIG. 4-C. For example, a detection classifier determined according to the process described in FIG. 4-B may be used in a detecting process described in FIG. 4-C. As another example, a diagnosing classifier determined according to the process described in FIG. 4-B may be used in a diagnosis process described in FIG. 4-C. As still another example, a true target determined according to the process described in FIG. 4-C may be used to train a diagnosing classifier described in connection with FIG. 4-B.

In some embodiments, a detecting process and a diagnosis process described in FIG. 4-C may be combined. For example, operations 434-438 may be performed on a candidate target to determine a true target, and then operations 434-438 may be performed on the true target to determine a property of the true target. For example, operations 434-438 may be performed on a suspected pulmonary nodule to determine a pulmonary nodule, and then operations 434-438 may be performed on the pulmonary nodule to determine whether the pulmonary nodule is benign or malignant.

In some embodiments, the process described in FIG. 4-A, the process described in FIG. 4-B, and the process described in FIG. 4-C may be combined. For example, a candidate target may be acquired according to the process described in FIG. 4-A. A detection classifier may be trained based on the candidate target according to operations 424-428 described in FIG. 4-B. The candidate target may be determined to be a true target or not based on a detection classifier according to operations 434-438 described in FIG. 4-C. The detection classifier acquired in 434 may be trained according to the process described in FIG. 4-B. A diagnosing classifier may be trained based on the true target according to operations 424-428 described in FIG. 4-B. The property of the true target may be determined based on the diagnosing classifier according to operations 434-438 described in FIG. 4-C. The diagnosing classifier acquired in 434 may be trained according to the process described in FIG. 4-B.

Figure 5:
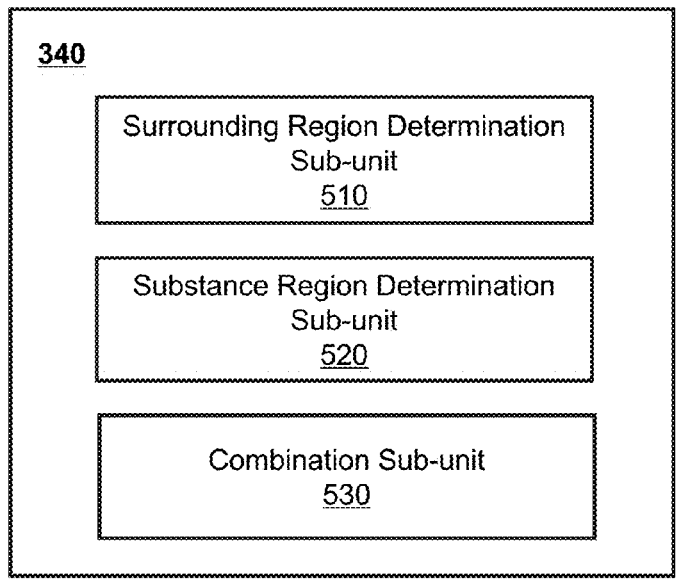
FIG. 5 is a block diagram illustrating an example of a candidate target determination unit according to some embodiments of the present disclosure.

FIG. 5 is a block diagram illustrating an example of a candidate target determination unit 340 according to some embodiments of the present disclosure. As shown, the candidate target determination unit 340 may include a surrounding region determination sub-unit 510, a substance region determination sub-unit 520, and a combination sub-unit 530. In some embodiments, the surrounding region determination sub-unit 510 may determine a region around a candidate target. The substance region determination sub-unit 520 may determine a substance region of a candidate target. In some embodiments, a candidate target may include a substance region and a surrounding region in morphology. The substance region may represent a main body of the candidate target, and the surrounding region may represent an edge of the candidate target. For example, a pulmonary nodule may be one or more circular (spherical or approximatively spherical in a three-dimensional image) dense shadows in the lung parenchyma with a diameter less than 3 cm. The pulmonary nodule represented in a medical image may include a definite edge, such as a smoothing edge, a lobulated edge, thorns, spines, or the like, or a combination thereof. The substance region of a pulmonary nodule may be a circular or quasi-circular region (spherical or approximatively spherical in a three-dimensional image) in the pulmonary nodule. The surrounding region of the pulmonary nodule may be a blurry edge, such as a thorn region, or other irregular region or curve. In some embodiments, the combination sub-unit 530 may combine a substance region and a surrounding region to determine a candidate target.

Figure 6:
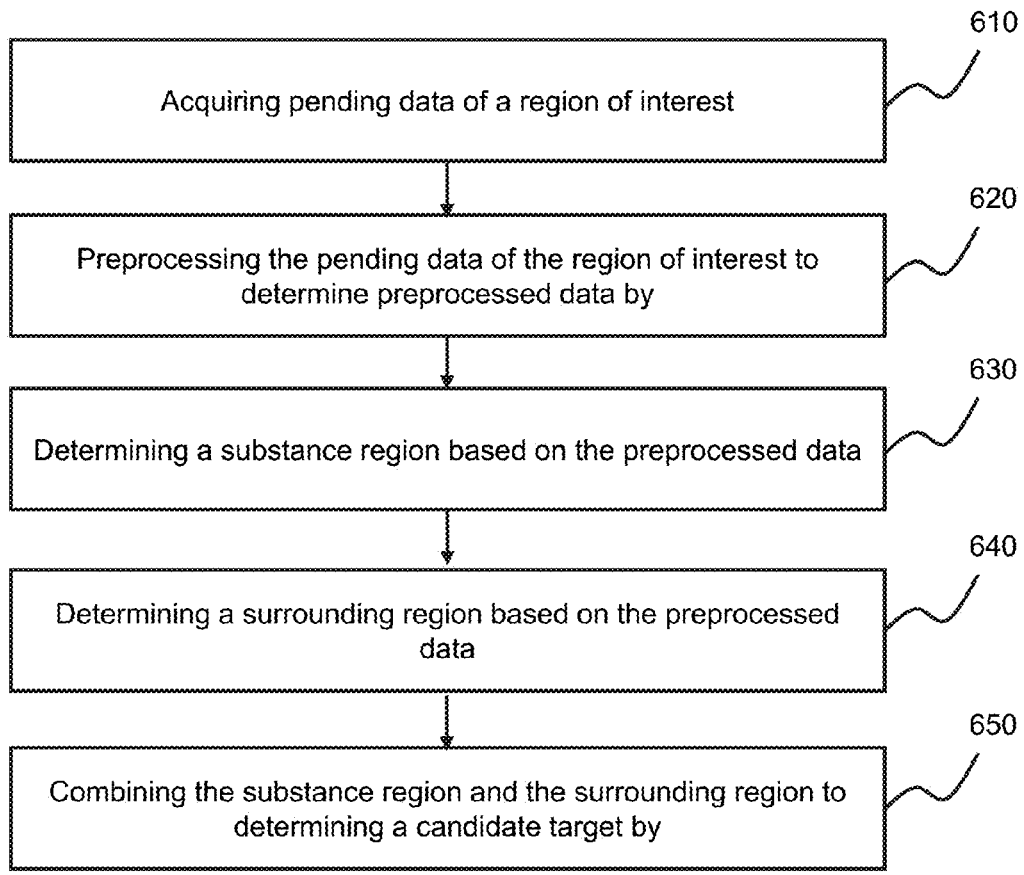
FIG. 6 is a flowchart illustrating an exemplary process for determining a candidate target by a candidate target determination unit according to some embodiments of the present disclosure.

FIG. 6 is a flowchart illustrating an exemplary process for determining a candidate target by a candidate target determination unit 340 according to some embodiments of the present disclosure.

In 610, pending data relating to an ROI may be acquired. Operation 610 may be performed by the preprocessing unit 330.

In 620, preprocessed data may be determined by preprocessing the pending data of the ROI. Operation 620 may be performed by the preprocessing unit 330. In some embodiments, the preprocessing may include preliminary positioning, enhancement processing, interpolation processing, morphology processing, denoising processing, or the like, or a combination thereof. The preliminary positioning may be performed to determine a rough region of a candidate target in the ROI. The preliminary positioning may be performed automatically, semi-automatically, manually, etc. The enhancement processing may be performed to highlight a structure or region in the ROI. The enhancement processing may include a Hessian dot-enhancement, a Hessian line-enhancement, or the like, or a combination thereof. The interpolation processing may be performed to balance voxel sizes in the ROI. The morphology processing may be performed to analyze and identify a candidate target by processing a shape of a structure in the ROI based on an element with a specific morphological structure. The morphology processing may include an expansion operation, a corrosion operation, an open operation, a closed operation, or the like, or a combination thereof. The denoising operation may be performed to remove noise caused by machines and/or object motions in the ROI. The denoising operation may employ a mean filtering, a Wiener filtering, a morphology filtering, a median filtering, or the like, or a combination thereof.

In 630, a substance region may be determined based on the preprocessed data. Operation 630 may be performed by the substance region determination sub-unit 510. In 640, a surrounding region may be determined based on the preprocessed data. Operation 640 may be performed by the surrounding region determination sub-unit 510. In some embodiments, a segmentation model may correspond to a segmentation technique. In some embodiments, the substance region and/or the surrounding region may be determined based on a segmentation model. The segmentation model may include a threshold segmentation model, a region growing segmentation model, a watershed segmentation model, a statistical segmentation model, a morphological segmentation model, or the like, or a combination thereof. The threshold segmentation model according to threshold number may include a single threshold segmentation model, a multi-threshold segmentation model, etc. The threshold segmentation model according to an algorithm applied by the model may include an iterative threshold segmentation model, a histogram segmentation model, the Otsu segmentation model, etc. The morphological segmentation model may include a Hessian dot-enhancement model, a Hessian-line enhancement model, a multi-scale Gaussian template matching model, a multi-scale morphological filtering model, etc. The edge-based segmentation model may include a level set algorithm. The statistical segmentation model may include a variational expectation maximization, a K-means model, a Fuzzy C-means model, or the like, or a combination thereof.

In 650, a candidate target may be determined by combining the substance region and the surrounding region. Operation 650 may be performed by the combination sub-unit 530. In some embodiments, the candidate target may be a combination of the substance region and the surrounding region.

It should be noted that the flowchart for determining a candidate target depicted above is provided for the purposes of the illustration, and not intended to limit the scope of the present disclosure. For persons having ordinary skills in the art, various variations and modification may be conducted under the teaching of the present disclosure. For example, operation 620 may be omitted, and operation 610 may be performed by the substance region determination sub-unit 510 and/or the surrounding region determination sub-unit 520. As another example, operations 630 and 640 may be performed without a specific order. Operation 630 may be performed first, operation 640 may be performed first, or operations 630 and 640 may be performed synchronously. However, those variations and modifications may not depart the scope of the present disclosure.

Figure 7:
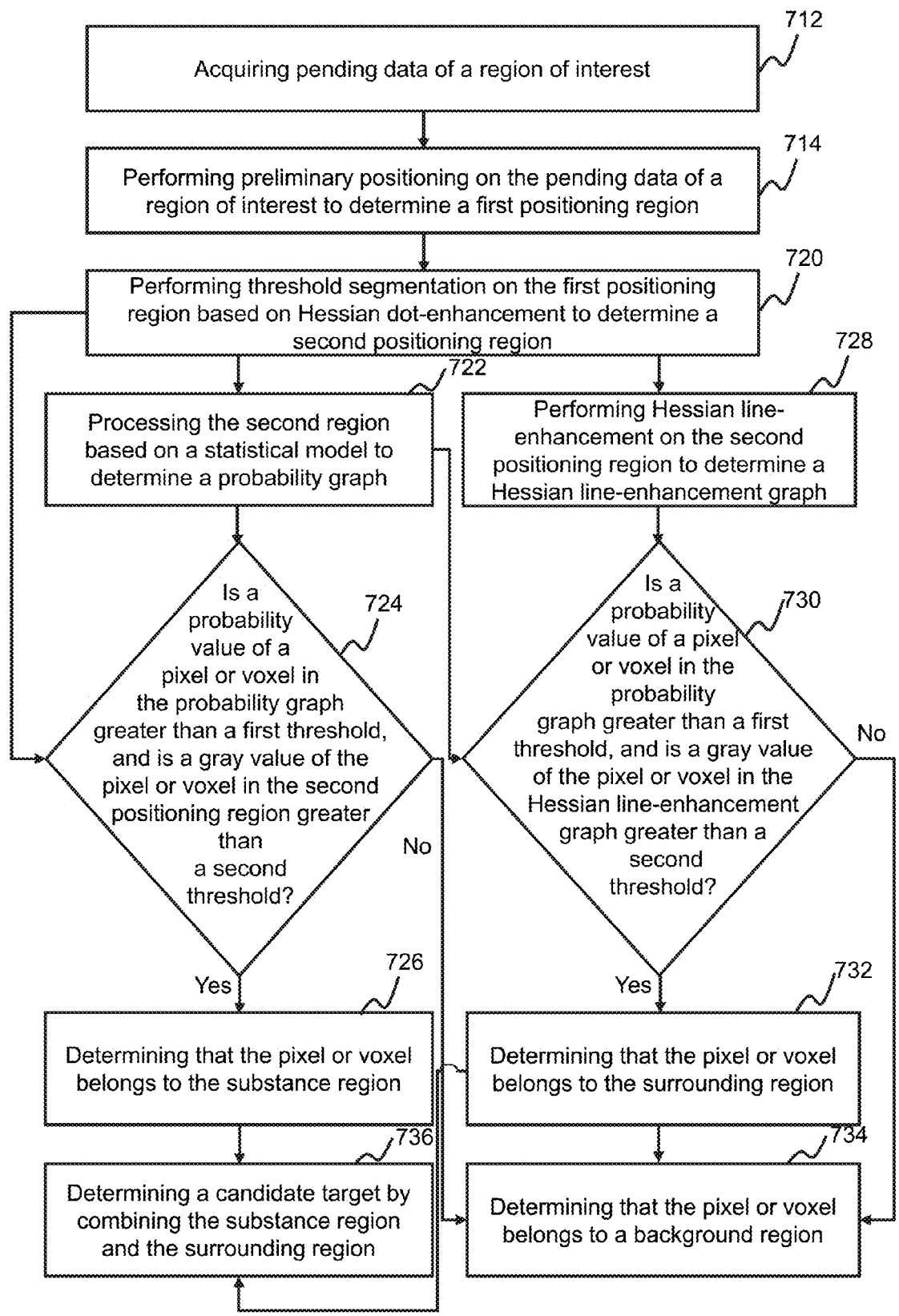
FIG. 7 is a flowchart illustrating an exemplary process for determining a candidate target by a candidate target determination unit according to some embodiments of the present disclosure.

FIG. 7 is a flowchart illustrating an exemplary process for determining a candidate target by a candidate target determination unit 340 according to some embodiments of the present disclosure. The determination of the candidate target may be performed by the candidate target determination unit 340.

In 712, pending data of a region of interest (ROI) may be acquired.

In 714, a first positioning region may be determined by performing preliminary positioning on the pending data of the ROI. In some embodiments, the first positioning region may include one or more regions. In some embodiments, the preliminary positioning may be performed to reduce the calculation amount and improve the efficiency for determining the candidate target. In some embodiments, the preliminary positioning may be performed based on a substance region of a candidate target. For example, in a process for detecting a pulmonary nodule, the first positioning region may be determined by performing the preliminary positioning based on a shape of the substance region of pulmonary nodule (e.g., circular or quasi-circular). The first positioning region may include a suspected pulmonary nodule, a blood vessel, a pulmonary parenchyma, or the like, or a combination thereof. In some embodiments, the first positioning region may be represented by a first outer rectangle frame. For example, in a 3D lung CT image with a size of 256 mm*256 mm*200 mm, the first positioning region with a size of 35 mm*35 mm*35 mm may be determined by performing the preliminary positioning. In some embodiments, the preliminary positioning may be performed manually, semi-automatically, automatically, etc. For example, the preliminary positioning may be performed by drawing the first positioning region manually on the pending data. As another example, the preliminary positioning may be performed by determining a long axis in the pending data traversing the substance region of the candidate target, selecting one or more seed points based on the long axis, and determining the first positioning region based on a threshold-based region growing technique. As still another example, the first positioning region may be determined by performing the preliminary positioning based on a specific algorithm automatically.

In 720, a second positioning region may be determined by performing a threshold segmentation on the first positioning region based on Hessian dot-enhancement. In some embodiments, the threshold segmentation based on Hessian dot-enhancement may be performed to enhance a circular or quasi-circular (or spherical or quasi-spherical in a 3D image) structure, decrease a region for determining a candidate target, and improve the accuracy and speed for determining the candidate target. For example, in a process for detecting a pulmonary nodule, because of the similarity of gray scale distribution corresponding to pulmonary blood vessels, bronchus, and pulmonary nodules in a CT image, it is easy to make a misdiagnosis or missed diagnosis to the pulmonary nodule. In fact, blood vessels, bronchus, and pulmonary nodules may be different in the spatial morphology. For example, the pulmonary blood vessels and the bronchus may be in a tube structure, and the pulmonary nodules may include a substance region and a surrounding region. The substance region may be circular or quasi-circular (or spherical or spherical in a 3D image). Therefore, the second positioning region may be determined by performing a threshold segmentation based on Hessian dot-enhancement for distinguishing the substance region of pulmonary nodule from noises (e.g., the pulmonary blood vessels, the bronchus, etc.) by enhancing the substance region of pulmonary nodule.

For illustration purposes, a threshold segmentation based on a Hessian dot-enhancement may be performed on a 3D image as an example. The threshold segmentation based on Hessian dot-enhancement may include: performing a Gaussian smoothing on the 3D image, determining a second derivative of each voxel value denoted by f (x, y, z) in the 3D image, the voxel value representing a gray value of the voxel, generating a Hessian matrix based on second derivatives of the voxel value on different directions, determining proper values of the Hessian matrix, and determining a dot enhanced value by adding the proper value to Equation (2). The dot enhanced value may represent a voxel value determined by processing the voxel by the threshold segmentation based on Hessian dot-enhancement. The Hessian matrix and the voxel value determined by the threshold segmentation based on Hessian dot-enhancement may be determined according to Equations (1) and (2):

$$H = \begin{bmatrix} f_{xx} & f_{xy} & f_{xz} \\ f_{yx} & f_{yy} & f_{yz} \\ f_{zx} & f_{zy} & f_{zz} \end{bmatrix}, \quad (1)$$

and $$z_{dot}(\lambda_1, \lambda_2, \lambda_3) = \begin{cases} |\lambda_3|^2/\lambda_1, & \text{if } \lambda_1 < 0, \lambda_2 < 0, \lambda_3 < 0 \\ 0, & \text{other} \end{cases}, \quad (2)$$

wherein $f_{xx}$ refers to a second derivative of a voxel on X direction, $f_{xy}$ refers to a second derivative on Y direction of the first derivative on X direction, $\lambda_1$, $\lambda_2$, and $\lambda_3$ refer to proper values of the Hessian matrix, $z_{dot}$ refers to a voxel value determined by processing a voxel by the threshold segmentation based on Hessian dot-enhancement.

In some embodiments, the second positioning region may include a candidate target and a background region. The background region may include a structure that does not belong to the candidate target. For example, in a process for detecting a pulmonary nodule, the background region may include pulmonary blood vessels, bronchus, etc. In some embodiments, the second positioning region may be represented by a second outer rectangle frame. In some embodiments, the area of the first outer rectangle may be less than the area of the second outer rectangle.

It should be noted that the description for the threshold segmentation based on a Hessian dot-enhancement depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure. For example, the threshold segmentation based on Hessian dot-enhancement may be performed on a 2D image.

In 722, a probability graph may be determined by processing the second positioning region based on a statistical segmentation model. In some embodiments, the statistical segmentation model may be a segmentation model that is not based on the morphology. Candidate targets in different shapes may be segmented based on the statistical segmentation model. The statistical segmentation model may classify pixels or voxels in an image into at least two types. For example, in a process for detecting a pulmonary nodule, in a 3D image, the statistical segmentation model may be performed to determine whether a voxel is a pulmonary nodule. In some embodiments, the statistical segmentation model may include a variational expectation maximization model. In some embodiments, the probability graph may be determined by processing the second positioning region based on the variational expectation maximization model. The determination of the probability graph by performing the variational expectation maximization model on the second positioning region may include that voxels in the candidate target and the background region may comply with a Gaussian distribution, the mean value and the standard deviation of the Gaussian distribution may comply with a Gaussian-Wishar distribution, and the prior probability of the Gaussian distribution may comply with a Dirichlet distribution. The Gaussian-Wishart distribution and the Dirichlet distribution may be illustrated by Equations (3) and (4) below:

$$p(\mu,\Lambda)=p(\mu|\Lambda)p(\Lambda)=\Pi_{k=1}^{K}N(\mu_k|m_0,(\beta_0\Lambda_k)^{-1})W(\Lambda_k|w_0,v_0), \quad (3)$$

and $$p(\Omega)=\text{Dir}(\pi|\alpha_0)=C(\alpha_0)\Pi_{k=1}^{K}\pi_k^{\alpha_0-1}, \quad (4)$$

where $\pi$ refers to a random variable that is a prior probability of the Gaussian mixing distribution, $\alpha_0$ is a constant, k refers to a distribution number of the Gaussian distribution, $\mu$ refers to a mean value, and $\Lambda$ refers to a variance. A joint probability density function including five random variables may be illustrated by Equation (5). $p(X,Z,\pi,\mu,\Lambda)$ may be determined by determining $\alpha_k$, $\beta_0$, $m_k$, $w_k$ and $v_k$ based on the variational expectation maximization model. Then the probability graph of the second positioning region may be determined by determining probabilities of pixels or voxels in the second positioning region. The joint probability density function may be illustrated by Equation (5) below:

$$p(X,Z,\pi,\mu,\Lambda)=p(X|Z,\mu,\Lambda)p(Z|\pi)p(\pi)p(\mu|\Lambda)p(\Lambda). \quad (5)$$

In some embodiments, the spatial positons of pixels or voxels in the probability graph may correspond to the spatial positions of pixels or voxels in the second positioning region. The values of pixels or voxels in the probability graph may represent probabilities of which pixels or voxels to belong to a candidate target.

In 724, the candidate target determination unit 340 may determine whether a probability value of a pixel or voxel in the probability graph is greater than a first threshold and whether a gray value of the pixel or voxel in the second positioning region is greater than a second threshold. If the probability value of the pixel or voxel in the probability graph is greater than the first threshold and the gray value of the pixel or voxel in the second positioning region is greater than the second threshold, the process may proceed to 726. In 726, the pixel or voxel may be determined that the pixel or voxel belongs to the substance region. If the probability value of the pixel or voxel in the probability graph is less than or equal to the first threshold and the gray value of the pixel or voxel in the second positioning region is less than or equal to the second threshold, the process may proceed to 734. In 734, the pixel or voxel may be determined that the pixel or voxel belongs to the surrounding region. In some embodiments, the first threshold may be in a range from 0 to 1. For example, the first threshold may be 0.5. In some embodiments, the second threshold may be set for protecting the substance region of the candidate target. The second threshold may be in a range from 0 to 100. In some embodiments, a pixel or voxel value may represent a color value of the pixel or voxel in an image. For a monochrome image, a pixel or voxel value may represent a gray value of the pixel or voxel in an image.

In 728, a Hessian line-enhancement graph may be determined by performing Hessian line-enhancement on the second positioning region. The Hessian line-enhancement may be performed to enhance a linear morphological structure in an image. For example, in a process for detecting a pulmonary nodule, the Hessian line-enhancement may be performed to enhance a tube structure (e.g., blood vessels) in the second positioning region by highlighting the noise (e.g., blood vessels).

For illustration purposes, the Hessian-line enhancement may be performed on a 3D image as an example. The Hessian-line enhancement may include: performing a Gaussian smoothing on the 3D image, determining a second derivative of each voxel value f (x, y, z) in the 3D image, the voxel value representing the gray value of a voxel, generating a Hessian matrix based on second derivatives of each voxel value on different directions, determining proper values of the Hessian matrix, and determining a line enhanced value by adding the proper values to Equation (6). The line enhanced value may represent a voxel value determined by processing the voxel by the Hessian line-enhancement. The voxel value corresponding to a voxel processed by the Hessian line-enhancement may be determined according to Equations (1) and (6) below:

$$z_{line}(\lambda_1,\lambda_2,\lambda_3)=\begin{cases}\lambda_2\frac{|\lambda_2|-|\lambda_3|}{\lambda_1}, & \text{if } \lambda_1<0, \lambda_2<0, \lambda_3<0 \\ 0, & \text{other}\end{cases} \quad (6)$$

where $\lambda_1$, $\lambda_2$, and $\lambda_3$ refer to proper values of Hessian matrix, and $z_{line}$ refers to a voxel value determined by processing a voxel by the Hessian line-enhancement.

It should be noted that the description for the Hessian line-enhancement depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure. For example, the Hessian line-enhancement may be performed on a 2D image.

In 730, the candidate target determination unit 340 may determine whether a probability value of a pixel or voxel in the probability graph is greater than the first threshold and whether a gray value of the pixel or voxel in the Hessian line-enhancement graph is less than a third threshold. If the probability value of the pixel or voxel in the probability graph is greater than the first threshold and the gray value of the pixel or voxel in the Hessian line-enhancement graph is less than the third threshold, the process may proceed to 732. In 732, the pixel or voxel may be determined that the pixel or voxel belongs to the surrounding region. If the probability value of the pixel or voxel in the probability graph is less than or equal to the first threshold and the gray value of the pixel or voxel in the Hessian line-enhancement graph is equal to or greater than the third threshold, the process may proceed to 734. In 734, the pixel or voxel may be determined that the pixel or voxel belongs to the background region. In some embodiments, the first threshold may be in a range from 0 to 1. For example, the first threshold may be 0.5. In some embodiments, the third threshold may be set for denoising and protecting the surrounding region of the candidate target in irregular shape. For example, in a process for detecting a pulmonary nodule, the third threshold may be set for removing noise (e.g., blood vessels, bronchus, etc.) and reserve non-spherical pulmonary nodules in irregular shape. The third threshold may be in a range from 0 to 100.

In 736, a candidate target may be determined by combining the substance region and the surrounding region.

In the process for determining the candidate target as described in FIG. 7, the first positioning region and the second positioning region may be determined based on the preliminary positioning and the threshold segmentation based on Hessian dot-enhancement. The initial form of the substance region of the candidate target may be enhanced, the computation volume may be reduced and the speed for determining the candidate target may be improved. The substance region may be determined based on the second positioning region determined by the probability graph and the threshold segmentation based on Hessian dot-enhancement. The surrounding region may be determined based on the probability graph and the Hessian line-dot enhancement. The candidate target may be determined by combining the substance region and the surrounding region.

It should be noted that the description for determining the candidate target depicted above is provided for the purposes of the illustration, and not intended to limit the scope of the present disclosure. For persons having ordinary skills in the art, various variations and modification may be conducted under the teaching of the present disclosure. For example, operation 714 may be omitted. However, those variations and modifications may not depart the scope of the present disclosure.

Figure 8:
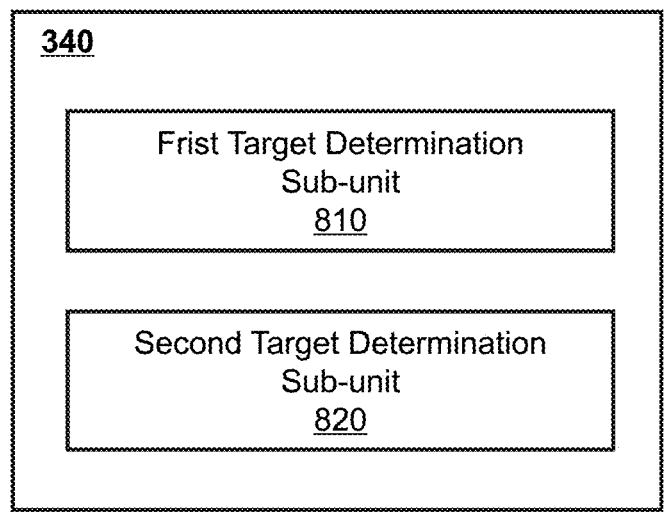
FIG. 8 is a block diagram illustrating an example of a candidate target determination unit according to some embodiments of the present disclosure.

FIG. 8 is a block diagram illustrating an example of a candidate target determination unit 340 according to some embodiments of the present disclosure. The candidate target determination unit 340 may include a first target determination sub-unit 810 and a second target determination sub-unit 820. The first target determination sub-unit 810 may determine a candidate target based on a first segmentation model. The second target determination sub-unit 820 may determine a candidate target based on a second segmentation model. In some embodiments, the first segmentation model and/or the second segmentation model may include one or more segmentation models. In some embodiments, a segmentation model may correspond to a segmentation technique. The segmentation model may include a threshold segmentation model, a region growing segmentation model, a watershed segmentation model, a statistical segmentation model, a morphological segmentation model, or the like, or a combination thereof. The threshold segmentation model according to threshold number may include a single threshold segmentation model, a multi-threshold segmentation model, etc. The threshold segmentation model according to algorithm may include an iterative threshold segmentation model, a histogram segmentation model, the Otsu segmentation model, etc. The morphological segmentation model may include a Hessian dot-enhancement model, a Hessian-line enhancement model, a multi-scale Gaussian template matching model, a multi-scale morphological filtering model, etc. The edge-based segmentation model may include a level set algorithm. The statistical segmentation model may include a variational expectation maximization (VEM) model, a K-means model, a Fuzzy C-means model, or the like, or a combination thereof. In some embodiments, the first target determination sub-unit 810 may apply a morphological segmentation model (e.g., a fixed region growing algorithm). The morphological segmentation model may be performed based on gray values of pixels or voxels. The segmentation technique based on a morphological segmentation model may segment a target based on gray values of pixels or voxels. The second target determination sub-unit 820 may apply a statistical segmentation model (e.g., a K-means model, a Fuzzy C-means model, a VEM model, etc.). The statistical segmentation model may be performed based on a distribution of gray values.

It should be noted that the description for the candidate target determination unit 340 depicted above is provided for the purposes of the illustration, and not intended to limit the scope of the present disclosure. For persons having ordinary skills in the art, various variations and modification may be conducted under the teaching of the present disclosure. For example, the candidate target determination unit 340 may include more than two target determination sub-units for determining a candidate target based on different segmentation models. However, those variations and modifications may not depart the scope of the present disclosure.

Figure 9:
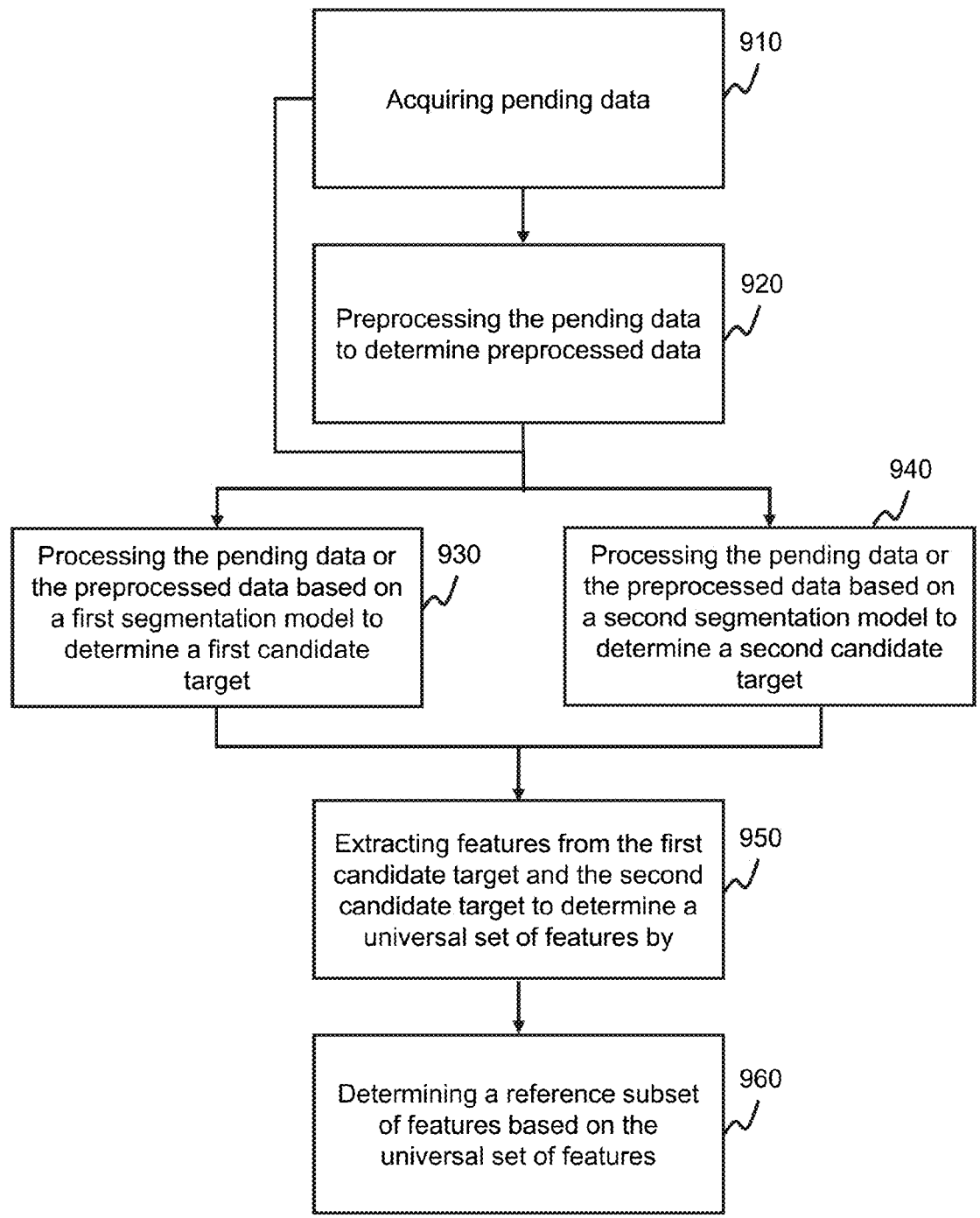
FIG. 9 is a flowchart illustrating an exemplary process for determining a reference subset of features according to some embodiments of the present disclosure.

FIG. 9 is a flowchart illustrating an exemplary process for determining a reference subset of features according to some embodiments of the present disclosure. The reference subset of features may be determined by selecting features from a universal set of features. The universal set of features may include feature data of a candidate target as extensive as possible. The feature data important for training a classifier may be selected to form the reference subset of features, so that the classifier may detect and diagnose quickly and accurately.

In 910, pending data may be acquired. Operation 910 may be performed by the preprocessing unit 330. The pending data may include original data, or a ROI determined based on the original data.

In 920, preprocessed data may be determined by preprocessing the pending data. Operation 920 may be performed by the preprocessing unit 330. In some embodiments, the preprocessing may include preliminary positioning, enhancement processing, interpolation processing, morphology processing, denoising processing, or the like, or a combination thereof. The preliminary positioning may be performed to determine a rough region of a candidate target in the ROI. The preliminary positioning may be performed automatically, semi-automatically, manually, etc. The enhancement processing may be performed to highlight a structure or region in the ROI. The enhancement processing may include a Hessian dot-enhancement, a Hessian line-enhancement, or the like, or a combination thereof. The Hessian dot-enhancement may be performed to enhance, for example, a circular or quasi-circular (or spherical or quasi-spherical in a 3D image) structure. The Hessian line-enhancement may be performed to enhance, for example, a linear structure. For example, in a process for detecting a pulmonary nodule, the pulmonary nodule may be circular or quasi-circular (or spherical or quasi-spherical in a 3D image). The Hessian dot-enhancement may be performed to enhance a circular or quasi-circular (or spherical or quasi-spherical in a 3D image) candidate pulmonary nodule. The Hessian line-enhancement may be performed to enhance a linear noise (e.g., blood vessels, bronchus, etc.). The candidate pulmonary nodule may be distinguished from other structures. The interpolation processing may be performed to generate isotropy or approximatively isotropy voxels. For example, the Hessian dot-enhancement or the Hessian line-enhancement may be performed on an image with an equal distance between two adjacent pixels or voxels, such as an interpolated 3D image with voxels in size of 1 mm*1 mm*1 mm. The morphology processing may be performed to analyze and identify a candidate target by processing a shape of a structure in the ROI based on an element with a specific morphological structure. The morphology processing may include filling an opening or gap in a pending structure. For example, in a process for detecting a pulmonary nodule, a cavitation or bubble in the pulmonary nodule may not be identified based on a segmentation process. The morphology processing may include filling an opening or gap in the pulmonary nodule. The morphology processing may include an expansion operation, a corrosion operation, an open operation, a closed operation, or the like, or a combination thereof. The denoising operation may be performed to remove noise caused by machines and/or object motions in the ROI. The denoising operation may employ a mean filtering, a Wiener filtering, a morphology filtering, a median filtering, or the like, or a combination thereof.

In 930, a first candidate target may be determined by processing the pending data or the preprocessed data based on a first segmentation model. In 940, a second candidate target may be determined by processing the pending data or the preprocessed data based on a second segmentation model. Operations 930 and 940 may be performed by the first target determination sub-unit 810 and the second target determination sub-unit 820, respectively. In some embodiments, the first segmentation model and/or the second segmentation model may include one or more segmentation models. In some embodiments, a segmentation model may correspond to a segmentation technique. The segmentation model may include a threshold segmentation model, a region growing segmentation model, a watershed segmentation model, a statistical segmentation model, a morphological segmentation model, or the like, or a combination thereof. The threshold segmentation model according to threshold number may include a single threshold segmentation model, a multi-threshold segmentation model, etc. The threshold segmentation model according to algorithm may include an iterative threshold segmentation model, a histogram segmentation model, the Otsu segmentation model, etc. The morphological segmentation model may include a Hessian dot-enhancement model, a Hessian-line enhancement model, a multi-scale Gaussian template matching model, a multi-scale morphological filtering model, etc.

The edge-based segmentation model may include a level set algorithm. The statistical segmentation model may include a variational expectation maximization (VEM) model, a K-means model, a Fuzzy C-means model, or the like, or a combination thereof.

In some embodiments, the first segmentation model may include a morphological segmentation model, such as a fixed threshold region growing model. The morphological segmentation model may be performed based on gray values of pixels or voxels. The second segmentation model may include a statistical segmentation model (e.g., a K-means model, a Fuzzy C-means model, a VEM model, etc.). The statistical segmentation model may be performed based on a distribution of gray values. In some embodiments, the first segmentation model may be a fixed region growing model based on Hessian enhancement. In some embodiments, the fixed region growing model based on Hessian enhancement may be a rough segmentation model. The statistical segmentation model (e.g., a VEM model) may be an accurate model.

In some embodiments, one or more candidate targets may be determined by performing the first segmentation model and the second segmentation model on a same region for multiple morphological structures in an image. More feature data may be extracted to improve the determination of a reference subset of features and the training of a classifier. For example, in a process for detecting a pulmonary nodule, for a 3D image, a fixed threshold region growing model based on a Hessian dot-enhancement may be performed on a spherical or quasi-spherical pulmonary nodule for determining a suspected pulmonary nodule. A fixed threshold region growing model based on a Hessian line-enhancement may be performed on a false positive source, for example, tubular blood vessels or bone tissues, for determining a suspected pulmonary nodule. In some embodiments, the emphasis of different segmentation models may be different. For example, a morphological segmentation model (e.g., a region growing segmentation model) may segment an image based on gray values of pixels or voxels and determine a segmented result with a constant morphology. A statistical segmentation model (e.g., a VEM model) may segment an image based on a distribution of gray values. Therefore, candidate targets determined based on different segmentation models may be different for a same region. The different candidate targets may supplement mutually. The universal set of features composed by a union set of feature data corresponding to different candidate targets may contain more effective feature information and expand the range of the universal set of features to improve the determination of a reference subset of features and the training of a classifier.

In some embodiments, one or more candidate targets may be determined by performing more than two segmentation models on a same region. The feature data related to the candidate targets may be selected from the candidate targets. A universal set of features may include feature data extracted from the candidate target as extensive as possible.

In 950, a universal set of features may be determined by extracting features from the first candidate target and the second candidate target. Operation 950 may be performed by the first feature extraction unit 351. In some embodiments, the features may be extracted for classifying a target from other targets based on measuring and/or processing the target. For example, in a process for detecting a pulmonary nodule, the candidate target may be a suspected pulmonary nodule. The extracted features may include a gray value related feature, a morphological feature, a texture feature, a serial slice feature, or the like, or a combination thereof. The gray value related feature may include a mean gray value, a gray value variance, or the like, or a combination thereof. In a 2D image, the morphological feature may include may include an area, a perimeter, a centroid, a diameter, a curvature, an eccentricity, a roundness, a compactness, a Fourier descriptor, a shape moment descriptor, or the like, or a combination thereof. In a 3D image, the morphological feature may include a volume, a perimeter, a centroid, a diameter, a curvature, an eccentricity, a sphericity, a compactness, a Fourier descriptor, a shape moment descriptor, or the like, or a combination thereof. The texture feature may include a statistic magnitude, a boundary clarity factor, a frequency domain parameter, etc.

In 950, the features may be extracted based on the pending data or the preprocessed data. In some embodiments, the preprocessed data may include an interpolation image, a Hessian dot-enhanced image, a Hessian line-enhancement image, a morphology image, or the like, or a combination thereof. In some embodiments, the universal set of features may include feature data extracted from the first candidate target and the second candidate target, the pending data, or the preprocessed data. In addition, the universal set of features may include non-image data. The non-image data may include medical history data, clinical trial results, symptoms, physiological data, pathological data, genetic data, or the like, or a combination thereof. For example, the non-image data for a pulmonary nodule detection may include age, gender, smoking history, cancer history, family history, occupation exposure, leisure exposure, previous lung disease, current lung disease, previous thoracic surgery, the number of satellite lesions around diagnosed lesions, lymph node size, suspicious lesions, lesions location in the lung, or the like, or a combination thereof.

In 960, a reference subset of features may be determined based on selecting features from the universal set of features. Operation 960 may be performed by the feature selection unit 360. In some embodiments, the selection of features may improve the accuracy of a classifier. In some embodiments, the selection of features may include selecting important features from the universal set of features for distinguishing different types according to different classify purposes, and rejecting non-effective features for the classification. For example, in a process for detecting a pulmonary nodule, the classification may be performed to determine whether a suspected pulmonary nodule is a true pulmonary nodule. The important features for determining a true pulmonary nodule (e.g., a mean gray value, a gray variance, etc.) may be selected and the features having no effect on determining a true pulmonary nodule (e.g., a frequency domain parameter feature) may be rejected. In a process for diagnosing a pulmonary nodule, the classification may be performed to determine whether the pulmonary nodule is benign or malignant. The important features for determining whether the pulmonary nodule is benign or malignant (e.g., a boundary clear degree factor) may be selected and the features having no effect on determining whether the pulmonary nodule is benign or malignant (e.g., a degree of circularity or sphericity) may be rejected. The features may be selected based on an exhaustion algorithm, a heuristic algorithm, a random algorithm, or the like, or a combination thereof. The random algorithm may include a genetic algorithm, a particle swarm algorithm, a simulated annealing algorithm, etc. The heuristic algorithm may include a breadth first search algorithm, a depth first search algorithm, etc. The heuristic algorithm may include a decision tree algorithm, a Relief algorithm, a forward (backward) selection algorithm, etc.

In some embodiments, Operations 910-940 may be performed to determine a candidate target. Operations 910-960 may be performed to determine a reference subset of features in a process for training a classifier.

It should be noted that the description for selecting features depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure. For example, Operation 920 may be omitted. Then Operation 910 may be performed by the first target determination sub-unit 810 and/or the second target determination sub-unit 820.

FIG. 10 is a schematic diagram for illustrating exemplary feature sources of feature extraction according to some embodiments of the present disclosure. Different preprocessed data may be determined based on performing different preprocessing on an original image. The preprocessed data may include an interpolation image, a Hessian dot-enhanced image, a Hessian line-enhancement image, a morphology image, or the like, or a combination thereof. Different candidate targets may be determined by performing different segmentation models on the preprocessed data. Features may be extracted from the original image, the preprocessed data, the candidate targets, or the like, or a combination thereof.

In some embodiments, S1 may represent an original medical image. The original medical image may include an X-rays image, a CT image, a PET image, an MRI image, an ultrasonic image, an electrocardiogram, an electroencephalogram, or the like, or a combination thereof. The original medical image may be 2D or 3D.

S2 may represent an interpolation image. The interpolation image may be determined by performing interpolation processing on the original medical image S1. The interpolation image S2 may provide an image with an equal distance in different directions for follow-up processing, for example, a Hessian dot-enhancement processing and a Hessian line-enhancement processing. For example, voxels in a 3D original medical image may be in a size of 1 mm*1 mm*1 mm based on interpolation processing.

S3 may represent a morphology image. The morphology image may be determined by performing morphological processing on the original medical image S1. The morphological processing may include an expansion operation, a corrosion operation, an open operation, a closed operation, or the like, or a combination thereof. The morphological processing may be performed to fill an opening or hole in a candidate target. For example, a cavitation or bubble (also referred to as an opening or hole) in a pulmonary nodule may not be identified based on a segmentation technique. The morphological processing may be performed to fill openings or holes in the pulmonary nodule.

A Hessian dot-enhanced image S4 and a Hessian line-enhanced image S5 may be determined by performing a Hessian dot-enhancement and a Hessian line-enhancement on the interpolation image S2. A segmented image S6 and a segmented image S7 may be determined by performing a fixed threshold region growing model on the Hessian dot-enhanced image S4 and the Hessian line-enhanced image S5, respectively. A VEM segmented image S8 may be determined by performing a VEM model on the medical image S1. An image S9 and an image S10 may be determined by performing a Hessian dot-enhancement and a Hessian line-enhancement on the VEM segmented image S8, respectively. A segmented image S11 may be determined by performing a fixed threshold region growing model on the segmented image S11. A segmented image S12 and a segmented image S13 may be determined by performing a fixed threshold region growing model and a VEM model respectively on the interpolation image S2. The images described above may supplement feature information related to a candidate target to improve a relevance between the feature data in a universal set of features and the candidate target, and improve the accuracy for training a classifier by using the feature data in the universal set of features.

It should be noted that the description for feature sources depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure. The feature sources may not be limited to the images described above. Feature sources may be determined by transforming a combination of the segmentation models and the preprocessing operations, and types and numbers of segmentation models or preprocessing operations. For example, a candidate target may be determined by performing a morphological processing, a Hessian enhancement, a morphological segmentation model (e.g., a fixed threshold region growing model), and a statistical segmentation model (e.g., a VEM model) on the interpolation image S2.

Figure 11:
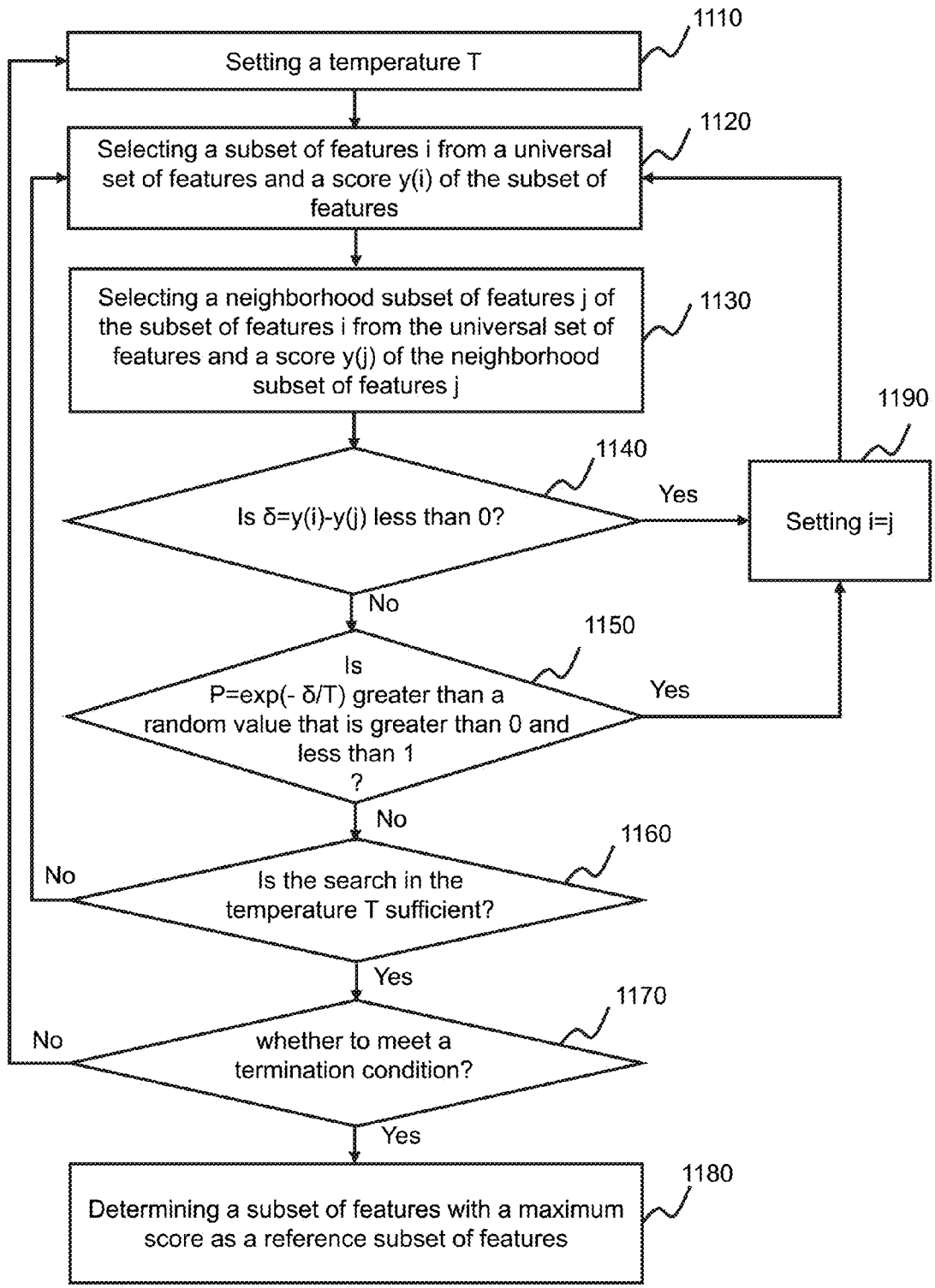
FIG. 11 is a flowchart illustrating an exemplary process for determining a reference subset of features based on a simulated annealing algorithm according to some embodiments of the present disclosure.

FIG. 11 is a flowchart illustrating an exemplary process for determining a reference subset of features based on a simulated annealing algorithm according to some embodiments of the present disclosure. The process for determining a reference subset of features may be performed by the feature selection unit 360. In some embodiments, the simulated annealing algorithm may be a probability algorithm for searching for an optimal solution in a large searching space. Using a simulated annealing algorithm, an initial value and a large enough initial temperature may be set. An optimal solution may be searched by performing iteration operations based on the initial value. At the initial temperature, if a specific number of iteration operations is finished, the initial temperature may be decreased to a new temperature slowly. Then a next number of iteration operations may be performed at the new temperature. If the temperature is decreased to a minimum value, the iteration operations may terminate, and the current optimal solution may be a final solution.

In 1110, a temperature T may be set. If the temperature T is an initial temperature, the initial temperature may be large enough to satisfy a condition for a comprehensive searching in the simulated annealing algorithm.

In 1120, a subset of features i and a score y(i) of the subset of features i may be selected from a universal set of features. In some embodiments, the subset of features i may include any combination of feature data in the universal set of features. The subset of features i may include one or more feature data. For example, the subset of features i may include an area, a gray mean, or the like, or a combination thereof. In some embodiments, the score y(i) of the subset of features may be determined based on the free-response receiver operating feature curve (FROC) or an area under a receiver operating feature curve (ROC). In some embodiments, the score y(i) of the subset of features may be determined by an area under a classifier curve trained by feature data in the subset of features i.

In 1130, a neighborhood subset of features j of the subset of features i and a score y(j) of the neighborhood subset of features j may be selected from the universal set of features. In some embodiments, the subset of features j may include an area, a gray mean, a gray variance, a compactness, or the like, or a combination thereof.

In 1140, the feature selection unit 360 may determine whether a score difference value δ between the score y(i) and the score y(j) (also referred to as δ=y(i)−y(j)) is less than 0. If δ<0, the process may proceed to 1190, and i may be set to be equal to j. If δ≥0, the process may proceed to 1150. Operation 1140 may be performed to compare the score of the subset of features i and the score of the subset of features j. As used herein, the score of the subset of features i and the score of the subset of features j may be also referred to as accuracy rate scores of classifiers determined by applying the feature data in the subset of features i and the subset of features j to train the classifiers. If the score of the subset of features j is greater than the score of the subset of features i, the accuracy rate of the classifier trained by the feature data in the subset of features j is greater than the accuracy rate of the classifier trained by the feature data in the subset of features i. Thereof, the subset of features j may be determined as a current solution to substitute the subset of features i for a next iteration.

In 1150, a probability P may be determined based on a formula exp(−δ/T), and whether the probability P is greater than a random value in a range from 0 to 1 may be determined. If the probability P is greater than the random value in the range from 0 to 1, the process may proceed to 1190, and i may be set to be j. If the probability P is less than or equal to the random value in the range from 0 to 1, the process may proceed to 1160. In some embodiments, the random value may be determined randomly or based on an iteration condition (e.g., an iteration temperature). The random value may be set to avoid a local optimal solution by receiving the subset of features j as a next iteration solution when the score of the subset of features j is less than the score of the subset of features i. If the score of the subset of features j is less than the score of the subset of features i, the subset of features j may be determined as a current solution with a probability P. If the probability P is greater than a random value in a range from 0 to 1, the subset of features j may be determined as a current solution. If the probability P is less than or equal to the random value in the range from 0 to 1, the subset of features j may not be determined as a current solution.

In 1160, whether the search is sufficient in the temperature T may be determined. If the search is non-sufficient, the process may proceed to 1120. If the search is sufficient, the process may proceed to 1170. In some embodiments, the sufficient search may mean that the amount of iterations reaches a preset value in the temperature T. In some embodiments, the sufficient search may also mean that an optimal solution searched in the temperature T may keep unchanged under several continuous iteration operations.

In 1170, whether the process meets a termination condition may be determined. If the process meets the termination condition, the process may proceed to 1180. In 1180, a subset of features with a maximum score may be determined as a reference subset of features. If the process does not meet the termination condition, the process may proceed to 1110. The temperature T may be reset and operations 1110-1180 may be iterated. In some embodiments, the termination condition may include that the current iteration temperature may be less than or equal to the preset minimum temperature, the iteration temperature may be stable, the amount of iterations may reach a preset value, the optimal solution may be keep unchanged under several continuous iteration operations, etc. In some embodiments, the preset minimum temperature may be 0 degree. In some embodiments, the reset temperature may be lower than the last temperature for meeting a condition of the simulated annealing algorithm. In some embodiments, the set of temperature for each iteration may affect the results of the simulated annealing algorithm. For example, if the annealing temperature declines slowly, the searching speed may drop greatly, and the possibility of searching for a globally optimal solution may be larger. If the annealing temperature declines quickly, the searching speed may be fast, and a globally optimal solution may be searched inadequately. In some embodiments, the temperature may be set based on experience or an annealing function. The annealing function may be used to set a temperature and control the annealing speed. The annealing function may include Equations (7), (8), (9), etc.:

$$T_1(t) = \frac{T_{01}}{\ln(1+t_1)}, \tag{7}$$

or $$T_2(t) = \frac{T_{02}}{\ln(1+a_2 t_2)}, \tag{8}$$

or $$T_3(t) = T_{03} a_3^{t_3}, \tag{9}$$

wherein $T_1(t)$, $T_2(t)$, and $T_3(t)$ represent different annealing functions, $T_{01}$, $T_{02}$, and $T_{03}$ represent initial temperatures, $t_1$, $t_2$, and $t_3$ represent the number of times for which the temperature declines, $a_2$ and $a_3$ are adjustable parameters that may be used to adjust the annealing speed.

In some embodiments, if the score different value δ is equal to y(j)−y(i), the simulated annealing algorithm may be performed to determine a subset of feature with a minimum score as a reference subset of features. In some embodiments, the simulated annealing algorithm may be performed to avoid a local optimal solution. At each temperature, the simulated annealing algorithm may be performed with a number of neighborhood motions. Then the temperature may be dropped slowly to make the accuracy rate of a classifier trained by the feature data in the reference subset of features as higher as possible.

Figure 12:
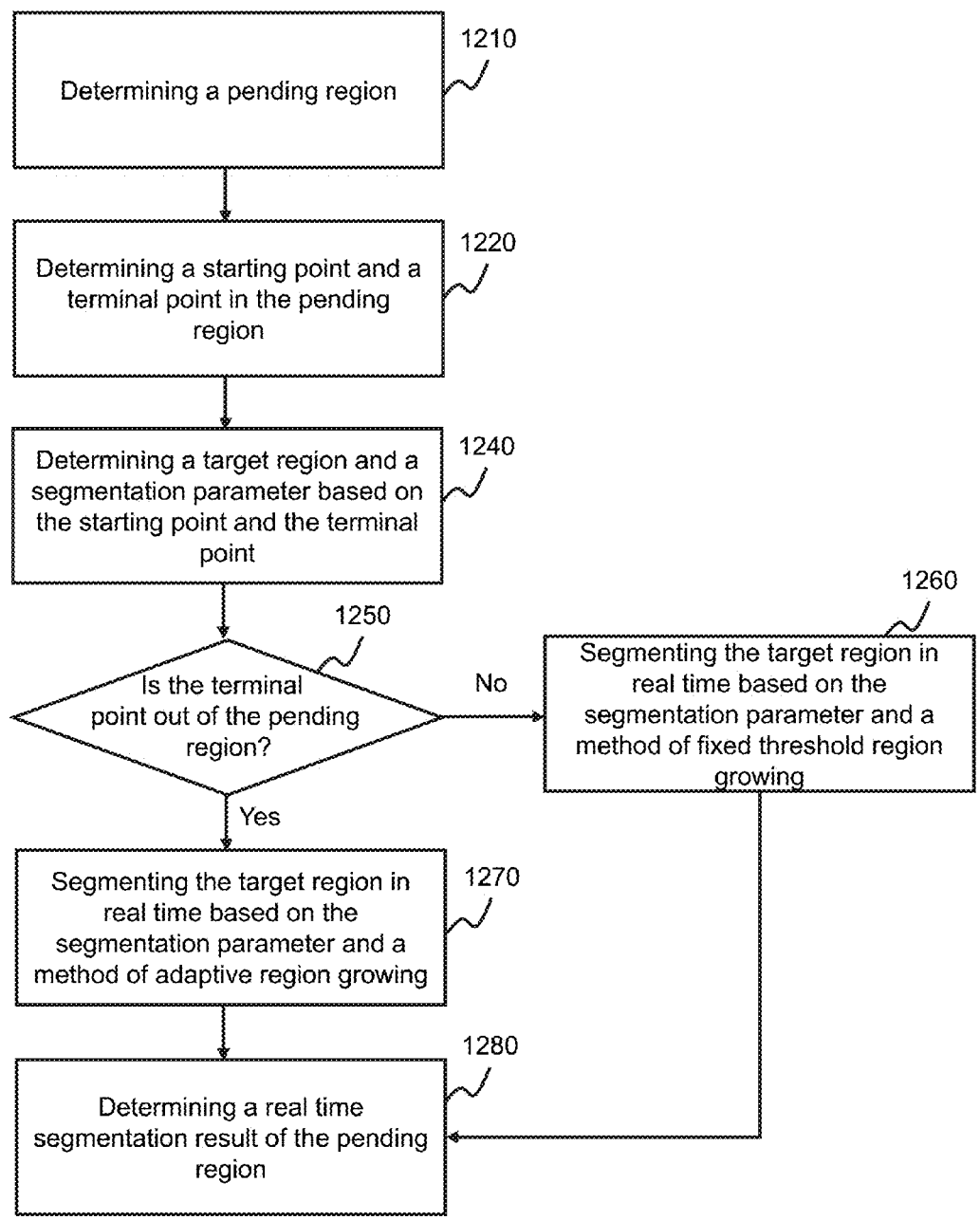
FIG. 12 is a flowchart illustrating an exemplary process for segmenting a region in real time according to some embodiments of the present disclosure.

FIG. 12 is a flowchart illustrating an exemplary process for segmenting a region in real time according to some embodiments of the present disclosure. The process may be performed to segmenting a target region in a medical image in real time. The target region may be positioned and one or more segmentation parameters may be adjusted synchronously. A user may control a segmentation result according to different conditions in real time. The process may be performed to determine a ROI in the disclosure. For example, the process may be performed to determine a lung image by separating the left and right lung regions from weasands and bronchi in a chest CT image. As another example, the process may be performed to determine a breast image from a chest X-rays image. The process may be performed to determine a candidate target in the disclosure. For example, the process may be performed to determine a suspected pulmonary nodule in a process for detecting a pulmonary nodule, or determine a calcification or a breast lump region in a process for detecting a breast. The process may be performed to determine a first positioning region by preliminary positioning in the disclosure. The process may be performed to determine a second positioning region in the disclosure.

In 1210, a pending region may be determined. In some embodiments, the pending region may be drawn in a medical image manually by a user based on experience. In some embodiments, the pending region may be determined based on a hardware (e.g., a computer processor), a software (e.g., a computer graphic processing), or a combination thereof.

In 1220, a starting point and a terminal point in the pending region may be determined. In some embodiments, the starting point and the terminal point may be determined manually, semi-automatically, automatically, or the like, or a combination thereof. For example, the starting point and the terminal point may be determined by moving a mouse manually or by touching a screen manually in the pending region.

In 1240, a target region and a segmentation parameter may be determined based on the starting point and the terminal point. The segmentation parameter may be a vertical component of a vector quantity from the starting point and the terminal point. The segmentation parameter may vary with a position of the terminal point. The segmentation parameter may be different under different image scenes. For example, the segmentation parameter applied in a cucoloris image and an enhanced image may be different for segmenting a breast MRI image in real time. The segmentation parameter may be adjusted according to clinic demands. The target region may be a circular region with a radius that may be equal to a horizontal component of the vector quantity from the starting point and the terminal point.

In 1250, whether the terminal point is out of the pending region may be determined. If the terminal point is within the pending region, the process may proceed to 1270. If the terminal point is out of the pending region, the process may proceed to 1260. In some embodiments, if the horizontal projection of the vector quantity from the starting point and the terminal point is within the pending region, the terminal point is within the pending region. If the horizontal projection of the vector quantity from the starting point and the terminal point is out of the pending region, the terminal point is out of the pending region.

In 1260, the target region may be segmented in real time based on the segmentation parameter and a technique of adaptive region growing. In some embodiments, a lower threshold of the adaptive region growing technique may be determined according to Equation (10) below:

$$th_L = \frac{1}{2}[(1-t) \times (T_{max} + T_{min})], \tag{10}$$

where $th_L$ refers to the lower threshold of the adaptive region growing technique, t refers to a segmentation parameter, $T_{max}$ refers to a maximum gray value, and $T_{min}$ refers to a minimum gray value. As illustrated in Equation (10), the maximum gray value and the minimum gray value may be updated with the varying of the segmentation parameter, and may be in direct proportion to the segmentation parameter. The lower threshold may be adjusted based on the segmentation parameter. The smaller the segmentation parameter is, the smaller the lower threshold may be, the more the pixels or voxels contained in the target region may be, and the larger the growing region may be.

In 1270, the target region may be segmented in real time based on the segmentation parameter and a technique of fixed threshold region growing. In some embodiments, the lower threshold may be a minimum gray value of a pixel or voxel on a line connecting the start point and the terminal point.

FIG. 13 is a schematic diagram illustrating an exemplary segmented result based on a real-time segmentation technique according to some embodiments of the present disclosure. As shown, 1 represents a pending region, 2 represents a start point, 4 represents a terminal point, 3 represents a target region determined by the start point 2 and the terminal point 4, and 5 represents a segmentation result of the pending region 1.

FIG. 14-A and FIG. 14-B are schematic diagrams illustrating exemplary segmented results based on a real-time segmentation technique according to some embodiments of the present disclosure. As shown, a segmentation parameter is a vertical component 8 of a vector quantity 6 from a starting point 2 and a terminal point 4. A target region 3 is a circular region with a radius that may be a horizontal component 7 of a vector quantity from the starting point 2 and the terminal point 4. The target region 3 is segmented in real time by controlling the terminal point 4. If the terminal point 4 is within the pending region 1, the segmented result 5 may be determined by segmenting the target region 3 in real time based on a technique of fixed threshold region growing shown in FIG. 14-A. If the terminal point 4 is out of the pending region 1, the segmented result 5 may be determined by segmenting the target region 3 in real time based on a technique of adaptive region growing shown in FIG. 14-B. Whether the terminal point 4 is within the pending region 1 may be determined based on the horizontal projection of the vector quantity 6 from the starting point 2 and the terminal point 4. If the horizontal projection of the vector quantity 6 from the starting point 2 and the terminal point 4 is within the pending region 1, the terminal point 4 is within the pending region 1. If the horizontal projection of the vector quantity 6 from the starting point 2 and the terminal point 4 is out of the pending region 1, the terminal point 4 is out of the pending region 1.

Figure 15:
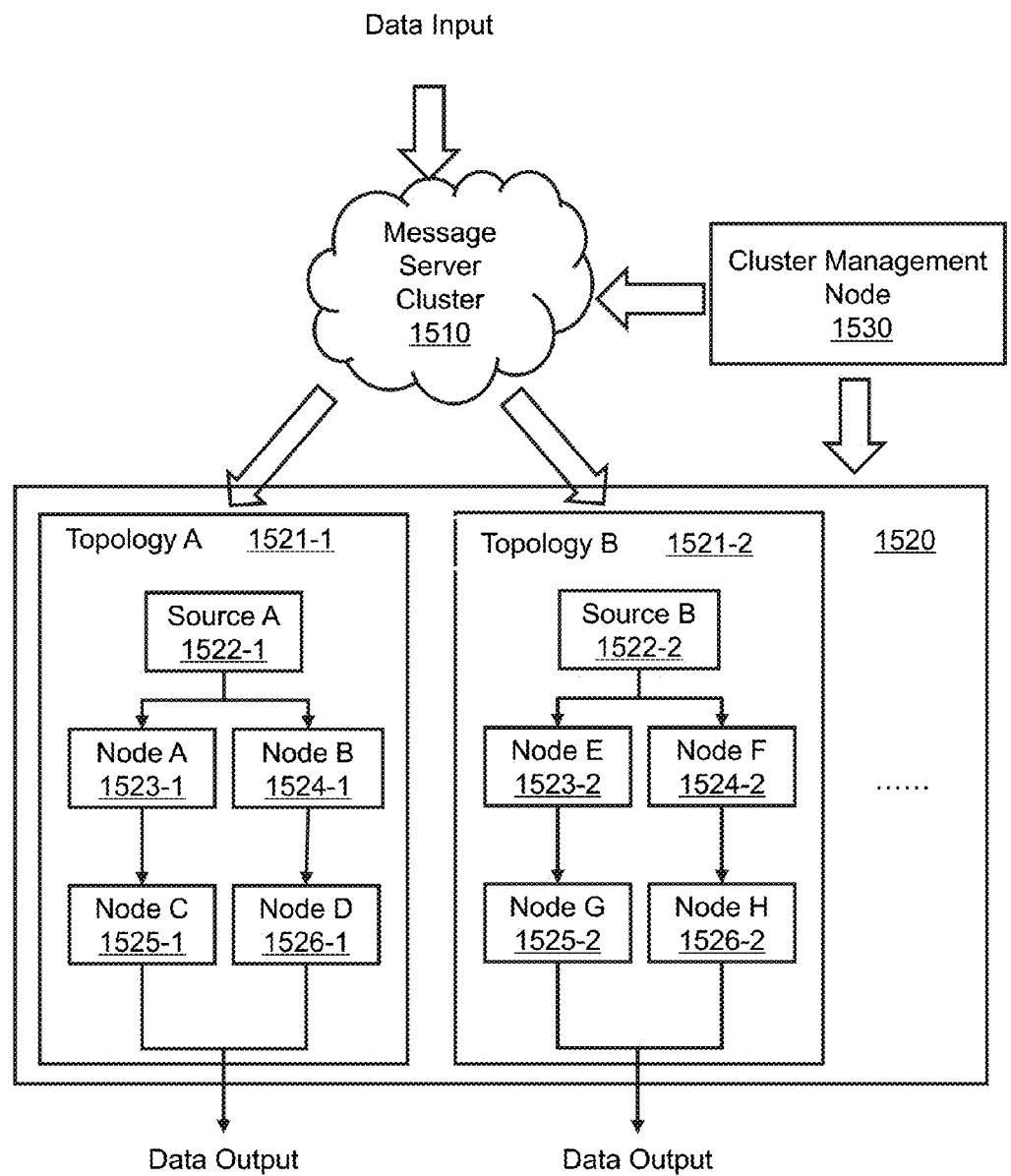
FIG. 15 is a block diagram illustrating an example of a real-time streaming parallel computing mode according to some embodiments of the present disclosure.

FIG. 15 is a block diagram illustrating an example of a real-time streaming parallel computing mode according to some embodiments of the present disclosure. In some embodiments, a server 130 may perform all processes in a serial computing mode by one single server or in a real-time streaming parallel computing mode (as shown in FIG. 15). In some embodiments, a plurality of instructions may be performed simultaneously in the parallel computing mode. A computing process may be resolved into one or more portions, and the one or more portions may be performed in a parallel computing mode. In some embodiments, in a real-time streaming mode, a procedure may be performed to monitor data generation. For example, a portion of generated data may be transmitted to a real-time streaming computing system for processing, and the processed data may be outputted or stored in a database. In some embodiments, a real-time computing mode may, for example, collect, process, and analyze data by a lower delay time when the data vary in real time. For example, in a CAD system applying a real-time streaming parallel computing mode, data from one or more examined objects (e.g., multiple patients) or from different portions of one examined object may be processed simultaneously. At least one portion of the detecting or diagnosing result may be outputted. For example, when a portion of data is generated, the system may generate a detecting or diagnosing result by processing the portion of data in a real-time streaming parallel computing mode. Then the detecting or diagnosing result may be outputted.

As shown in FIG. 15, the server 130 for CAD in a real-time streaming parallel computing mode may include a message server cluster 1510, one or more work nodes 1520 and a cluster management node 1530. The message server cluster 1510 may distribute pending data in a streaming mode. The pending data may include an original medical image or intermediate data. The intermediate data may include an ROI, preprocessed data, a candidate target, feature data, or the like, or a combination thereof. The work node 1520 may acquire the pending data distributed by the message server cluster 1510 and acquire a classification result by processing the pending data in a real-time streaming parallel computing mode. The work node 1520 may acquire the pending data from the message server cluster 1510 initiatively. The cluster management node 1530 may coordinate the message server cluster 1510 and the work node 1520. The server 130 may process lesions and store the processing result in a database or a file device.

In some embodiments, the message server cluster 1510 may include a Scribe cluster, a Flume cluster, a Time Tunnel cluster, a Chukwa cluster, Kafka cluster, or the like, or a combination thereof. The server 130 may include a Storm system, a Spark system, a Samza system, a S4 system, or the like, or a combination thereof. The cluster management node 1530 may include a zookeeper cluster.

For illustration purposes, a real-time streaming parallel computing mode performed by the server 130 including a Zookeeper cluster, a Storm system, and a Kafka cluster may be illustrated as an example.

In some embodiments, the system may include a Storm frame cluster to process the pending data in a real-time streaming parallel computing mode. The Kafka cluster may release and subscribe messages in distributed mode with a high throughput. The Kafka cluster may classify and process data, and transmit the processed data to the Storm system. In some embodiments, external data may be transmitted to the Storm system for processing by the Kafka cluster. The external data may include an original medical image from a PACS system, a database, a file device, a medical imaging device, etc., or intermediate data (e.g., ROI data, preprocessed data, candidate target data, etc.).

In some embodiments, the Storm system may be an open source, distributed and higher fault-tolerant real-time streaming computing system. In the Storm system, the chart structure for real-time computing may be also referred to as a Topology. The Storm system may include one or more Topologies (e.g., a Topology A 1521-1, a Topology B 1521-2, etc.). The Topology may be submitted to clusters in the Storm system. A Mask node in the clusters may distribute codes and tasks to a Work node. The Work node may include one or more Supervisors. The Supervisors may monitor the servers. One Supervisor may include one or more Workers. The Topology may operate with one or more Workers. One Worker may include one or more Executors for executing one or more Tasks. A Topology may include one or more Spouts (e.g., a Spout A 1522-1, a Spout B 1522-2, etc.) and one or more data processing bolts (e.g., a node A 1523-1, a node B 1524-1, a node C 1525-1, a node D 1526-1, a node E 1523-2, a node F 1524-2, a node G 1525-2, a node H 1526-2, etc.). The Spouts may acquire data from the Kafka cluster initiatively and send the streaming data to the data processing nodes in Tuple form. The data processing nodes may transform the streaming data. For example, the data processing nodes may perform calculation operations and/or screening operations on the streaming data. The data processing nodes may send the data to other data processing nodes. For example, the Spout A 1522-1 may send the data from the Kafka cluster to the node A 1523-1. The node A 1523-1 may process the data and send the processed data to the node C 1525-1 for further processing. A Spout and/or a data processing node of a Topology may correspond to multiple Workers distributed in multiple Supervisors. The data processed by the Storm system may be outputted to a database for storing.

In some embodiments, the Zookeeper cluster may be a distributed application coordinating service with opening source codes. The Zookeeper cluster may coordinate the Kafka cluster and the Storm system, and store public data (e.g., heartbeat information, cluster state information or configuration information).

A detection process performed by the CAD system in real-time streaming parallel computing mode may be illustrated as an example. The detection process may be performed by the CAD system in a real-time streaming parallel computing mode. In some embodiments, the detection process in the CAD system may include a process for determining an ROI, a process for preprocessing, a process for determining a candidate target, a process for extracting features, and a process for classifying. In some embodiments, the process for determining an ROI, the process for preprocessing, and the process for determining a candidate target may be performed by, for example, one single server. When the candidate target is determined, the DICOM data may be sequenced into messages for entering to the Kafka cluster queue. The Spouts in one or more Topologies of the Storm system may acquire the data initiatively from the Kafka cluster queue. The data processing bolts in the Topologies may process the data in the real-time streaming mode to extract features and classify the candidate target.

In some embodiments, the detection operations processed by the Storm system may be assigned in any manner. For example, the process for determining an ROI, the process for preprocessing, the process for determining a candidate target, and the process for extracting features may be performed by, for example, one single server and the process for classifying may be performed by the Storm system in a real-time streaming parallel computing mode. For example, a portion of data may be processed by, for example, one single server for performing the process for determining an ROI, the process for preprocessing, and the process to determine a candidate target, and by the Storm system in a real-time streaming parallel computing mode for performing the process for extracting features and the process for classifying. Other portions of data may be processed by, for example, one single server for performing the process for determining an ROI, the process for preprocessing, the process to determine a candidate target and the process for extracting features, and by the Storm system in a real-time streaming parallel computing mode for performing the process for classifying. In some embodiments, original data may be sent to the Kafka cluster. The Storm system may perform the process for determining an ROI, the process for preprocessing, the process for determining a candidate target, the process for extracting features, and the process for classifying in a real-time streaming parallel computing mode.

EXAMPLES

It should be noted that the description for embodiments depicted below is provided for the purposes of the illustration, and not intended to limit the scope of the present disclosure.

Example 1

FIG. 16-A is an exemplary original chest computed tomography (CT) image obtained through scanning a human body by a computed tomography (CT) device according to some embodiments of the present disclosure. The original chest CT image includes a background region, lung tissues, fat tissues, muscles, blood vessels, tracheas, skeletons, etc. Pulmonary parenchyma may be extracted by processing the original chest CT image. FIG. 16-B is an exemplary mask image relating to a pulmonary parenchyma according to some present disclosure. The pulmonary parenchyma represented in the image is bright. FIG. 16-C is an exemplary segmented result relating to a pulmonary nodule according to some embodiments of the present disclosure. The determined pulmonary nodule represented in the image is bright.

Example 2

FIG. 17 is a schematic diagram illustrating an example of a diagnosis result generated by a computer aided diagnosis (CAD) system according to some present disclosure. As shown, the left part of the diagram is a detection result of a suspected pulmonary nodule and the right part is a diagnosis result as to whether the pulmonary nodule is benign or malignant. The diagnosing result is 0.733 (also referred to as a probability of being a malignant pulmonary nodule). The pulmonary nodule was diagnosed to be malignant by the CAD system.

Example 3

FIGS. 18-A and 18-B are exemplary images of a breast lump region segmented by a region real-time segmentation algorithm according to some present disclosure. As shown in FIGS. 18-A and 18-B, a start point 2 was determined as a seed point for positioning a target region. A terminal point 4 was selected by moving a mouse or touching a screen. A segmented parameter and size of the target region were adjusted by controlling the terminal point 4. The segmented result of a breast lump was determined in real time and represented in FIGS. 18-A and 18-B as the highlighted portions. The segmented result 9 as shown in FIG. 18-A was determined by a technique of a fixed threshold region growing corresponding to the terminal point within the pending region. The segmented result 10 as shown in FIG. 18-B was determined according to a technique of adaptive region growing corresponding to the terminal point out of the pending region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure. For example, aspects of the present disclosure may be implemented entirely hardware, entirely software (including firmware, resident software, micro-code, etc.) or combining software and hardware implementation that may all generally be referred to herein as a "unit," "module," or "system."

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method of training a classifier implemented on a computing device having one or more processors and one or more storage devices, the method comprising:
   acquiring an original image;
   preprocessing the original image to determine preprocessed data, the preprocessing including an interpolation treatment, a morphological treatment, a Hessian dot-enhancement treatment, or a Hessian line-enhancement treatment;
   segmenting, based on at least two segmentation models, the preprocessed data to determine a candidate target;
   extracting features from the candidate target to determine a universal set of features;
   selecting features from the universal set of features to determine a reference subset of features, wherein the universal set of features includes features extracted from the candidate target; and
   performing, based on the reference subset of features, classifier training to determine a classifier.

2. The method of claim 1, wherein the original image includes an X-ray image, a computer tomography (CT) image, a Positron Emission Tomography (PET) image, a Magnetic Resonance (MR) image, an ultrasonic image, an electrocardiogram, or an electroencephalogram.

3. The method of claim 1, wherein the at least two segmentation models include a morphological model and a statistical model.

4. The method of claim 3, wherein the morphological model includes a fixed threshold region growing model based on a Hessian enhancement.

5. The method of claim 3, wherein the statistical model includes a clustering model.

6. The method of claim 5, wherein the clustering model includes a variational expectation maximization model.

7. The method of claim 1, wherein the selecting features from the universal set of features to determine the reference subset of features includes a simulated annealing algorithm.

8. A method of computer aided diagnosis implemented on a computing device having one or more processors and one or more storage devices, the method comprising:
   acquiring an original image;
   segmenting the original image based on at least o segmentation models to determine a substance region of a candidate target and a surrounding region of the candidate target; and
   determining the candidate target based on the substance region and the surrounding region, the determining the candidate target based on the substance region and the surrounding region comprises:
   performing preliminary positioning on the original image to determine one or more first positioning regions;
   performing, based on Hessian dot-enhancement, threshold segmentation on the one or more first positioning regions to determine a second positioning region, the second positioning region including the candidate target and a background region, the candidate target including the substance region and the surrounding region that surrounds the substance region;
   determining the substance region of the candidate target based on the second positioning region and a statistical model;
   determining the surrounding region of the candidate target based on the statistical model and a morphological model; and
   combining the substance region and the surrounding region to determine the candidate target.

9. The method of claim 8, wherein the original image includes an X-ray image, a computer tomography (CT) image, a Positron Emission Tomography (PET) image, a Magnetic Resonance (MR) image, an ultrasonic image, an electrocardiogram, or an electroencephalogram.

10. The method of claim 8, wherein the determining one or more first positioning regions by performing the preliminary positioning on the original image comprises;
    receiving information regarding the one or more first positioning region from a use;
    determining, based on the received information, the one or more first positioning regions;
    determining an axis that goes through the candidate target and selecting a seed point from the axis to determine the one or more first positioning regions using a region growing technique; or
    determining the one or more first positioning regions based on a detection processing.

11. The method of claim 8, wherein the statistical model includes a variational expectation maximization model.

12. The method of claim 11, wherein the determining the substance region of the candidate target based on the second positioning region and the statistical model comprises:
    processing, based on the variational expectation maximization model, the second positioning region to determine a probability graph;
    determining a pixel or voxel in the second positioning region corresponding to a pixel or voxel in the probability graph;
    determining that a probability value of the pixel or voxel is greater than the first threshold and the gray value of the pixel or voxel is greater than the second threshold;
    determining, in response to the determination the probability value of the pixel or voxel is greater than the first threshold, and the gray value of the pixel or voxel is greater than the second threshold, the pixel or voxel belongs to the substance region;
    determining that a probability value of the pixel or voxel is equal to or less than the first threshold, and a gray value of the pixel or voxel is equal to or less than the second threshold; and
    determining, in response to the determination the probability value of the pixel or voxel is equal to or less than the first threshold, and the pixel or voxel belongs to the background region.

13. The method of claim 12, wherein the morphological model includes a Hessian line-enhancement model.

14. The method of claim 13, wherein the determining the surrounding region comprises:
    processing the second positioning region, based on the Hessian line-enhancement model to determine a Hessian line-enhancement image;
    determining a pixel or voxel in the Hessian line-enhancement image corresponding to a pixel or voxel in the probability graph;

determining that a probability value of the pixel or voxel is greater than the first threshold and a gray value of the pixel or voxel is less than the third threshold;

determining, in response to the determination that the probability value of the pixel or voxel is greater than the first threshold and the gray value of the pixel or voxel is less than the third threshold, the pixel of voxel belongs to the surrounding region;

determining that a probability value of the pixel or voxel is equal to or less than the first threshold and a gray value of the pixel or voxel is equal to or greater than the third threshold; and determining, in response to the determination that the probability value of the pixel or voxel is equal to or less than the first threshold and the gray value of the pixel or voxel is equal to or greater than the third threshold, the pixel of voxel belongs to the background region.

15. The method of claim 14, wherein spatial positions of pixels or voxels in the probability graph, the second positioning region, and the Hessian line-enhancement image are corresponding.

16. The method of claim 8, further comprising:
acquiring a classifier including a reference subset of features;
extracting, based on the reference subset of features, features from the candidate target to determine feature data; and
classifying, based on the classifier and the feature data, the candidate target to determine a classification result.

17. A system of training a classifier, comprising:
one or more storage devices storing a set of instructions; and
one or more processors configured to communicate with the one or more storage devices, wherein when executing the set of instructions, the one or more processors are configured to cause the system to:
acquire an original image;
preprocessing the original image to determine preprocessed data, the preprocessing including an interpolation treatment, a morphological treatment, a Hessian dot-enhancement treatment, or a Hessian line-enhancement treatment;
determine a candidate target by segmenting the preprocessed data based on at least two segmentation models;
determine a universal set of features by extracting features from the candidate target;
determine a reference subset of features by selecting features from the universal set of features; and
determine a classifier by performing classifier training based on the reference subset of features.

* * * * *